U S005246622A

United States Patent [19]
Shimizu et al.

[11] Patent Number: 5,246,622
[45] Date of Patent: Sep. 21, 1993

[54] LIQUID CRYSTAL RACEMIC MIXTURE, LIQUID CRYSTAL COMPOSITION AND LIQUID CRYSTAL ELEMENT, PROCESS FOR MANUFACTURING LIQUID CRYSTAL ELEMENT, AND USES OF LIQUID CRYSTAL ELEMENT

[75] Inventors: Toyoji Shimizu, Tokyo; Katsuo Taniguchi, Yamaguchi; Shinichi Nishiyama, Sodegaura; Shoichi Miyakoshi, Sodegaura; Tooru Yamanaka, Sodegaura; Nobuyuki Doi, Sodegaura; Hideo Hama, Sodegaura, all of Japan

[73] Assignee: Mitsui Petrochemical Industries, Ltd., Tokyo, Japan

[21] Appl. No.: 731,978
[22] Filed: Jul. 18, 1991

[30] Foreign Application Priority Data

| Jul. 19, 1990 | [JP] | Japan | 2-190984 |
| Jul. 19, 1990 | [JP] | Japan | 2-190985 |
| Jul. 19, 1990 | [JP] | Japan | 2-190986 |
| Aug. 3, 1990 | [JP] | Japan | 2-207081 |
| Aug. 3, 1990 | [JP] | Japan | 2-207082 |
| Aug. 3, 1990 | [JP] | Japan | 2-207083 |

[51] Int. Cl.$^5$ .................... C09K 19/32; G02F 1/13
[52] U.S. Cl. .................... 252/299.62; 359/103
[58] Field of Search .................... 252/299.62; 359/103

[56] References Cited

U.S. PATENT DOCUMENTS

| 4,113,647 | 9/1978 | Coates et al. | 252/299.62 X |
| 4,119,558 | 10/1978 | Coates et al. | 252/299.62 X |
| 4,386,007 | 5/1983 | Krause et al. | 252/299.62 |
| 4,680,137 | 7/1987 | Isoyama et al. | 252/299.62 |
| 4,775,223 | 10/1988 | Yoshinaga et al. | 350/333 |
| 4,917,473 | 4/1990 | Watanabe et al. | 350/341 |
| 4,943,651 | 7/1990 | Nishiyama et al. | 560/56 |
| 5,053,164 | 10/1991 | Nishiyama et al. | 252/299.62 |
| 5,061,399 | 10/1991 | Jenner et al. | 252/299.62 |
| 5,072,021 | 12/1991 | Nakatsuka et al. | 560/56 |
| 5,143,644 | 9/1992 | Yamaoka et al. | 252/299.62 |

FOREIGN PATENT DOCUMENTS

| 0225728 | 10/1986 | European Pat. Off. |
| 0239910 | 12/1988 | European Pat. Off. |
| 0341922 | 5/1989 | European Pat. Off. |
| 0332409 | 7/1989 | European Pat. Off. |
| 0332456 | 10/1989 | European Pat. Off. |
| 0431929 | 6/1990 | European Pat. Off. |
| 0413585 | 8/1990 | European Pat. Off. |
| 2008292 | 1/1990 | Japan |
| 2049092 | 2/1990 | Japan |

OTHER PUBLICATIONS

Patent Abstracts of Japan, vol. 14, No. 197 (C-712) Apr. 23, 1990 and JPA-2-040 346 (Mitsui) Sep. 2, 1990.

*Primary Examiner*—Robert L. Stoll
*Assistant Examiner*—Cynthia Harris
*Attorney, Agent, or Firm*—Sherman and Shalloway

[57] ABSTRACT

The liquid crystal racemic mixture of the invention is represented by the formula [I]:

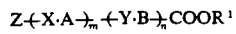

[I]

wherein R1 is a specific group of alkyl, alkoxy or halogenated alkyl, X and Y are either one of the following group: —COO—, —OCO—, —CH$_2$CH$_2$—, —CH$_2$O—, —OCH$_2$—, —COCH$_2$—, —CH$_2$CO— and —S—S—, or a single bond, A and B are each a specific bivalent group such as 1,4-phenylene group, Z is a group selected from the group consisting of

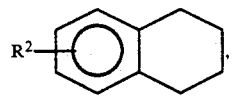

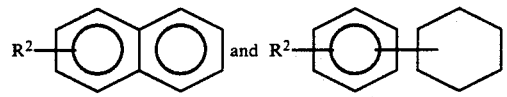

(wherein R$_2$ is an alkyl group, an alkoxy group or a halogenated alkyl group), and m and n are an integer of 0 to 2 (m and N not being simultaneously 0). The liquid crystal composition of the invention comprises the racemic mixture as described above. Moreover, the liquid crystal element of the invention comprises a liquid crystal material containing the liquid crystal racemic mixture as described above.

27 Claims, 12 Drawing Sheets

LIQUID CRYSTAL RACEMIC MIXTURE, LIQUID CRYSTAL COMPOSITION AND LIQUID CRYSTAL ELEMENT, PROCESS FOR MANUFACTURING LIQUID CRYSTAL ELEMENT, AND USES OF LIQUID CRYSTAL ELEMENT

FIELD OF THE INVENTION

The present invention relates to a racemic mixture showing liquid crystal properties, a liquid crystal composition comprising the racemic mixture, a liquid crystal element in which the liquid crystal composition is used, a process for manufacturing the liquid crystal element and uses of the liquid crystal element.

BACKGROUND OF THE INVENTION

Currently widely used display devices in which liquid crystal compounds are used are usually driven by TN (twisted nematic) mode.

When driving by TN mode is adopted, however, the positions of liquid crystal compound molecules in the element of the device must be changed in order to change a displayed image. As a result, there are involved problems that the driving time of the device becomes prolonged, and the voltage required for changing the liquid crystal compound molecular position, namely, power consumption becomes large.

Switching elements incorporating ferroelectric liquid crystal compounds, different from those in which TN mode or STN mode is utilized, can be functioned only by changing the molecular orientation direction of the liquid crystal compounds, and hence the switching time is markedly shortened. Further, the value Ps x E obtained from a spontaneous polarization (Ps) of the ferroelectric liquid crystal compound and an intensity of the electric field (E) applied is an effective energy output for changing the molecular orientation direction of the liquid crystal compounds, and accordingly the power consumption is also significantly diminished. Such ferroelectric liquid crystal compounds as mentioned above have two stable states, namely, bistability, in accordance with the direction of the applied electric field, and therefore show significantly excellent switching threshold value characteristics. Accordingly, the ferroelectric liquid crystal compounds are particularly appropriate for display devices for animations.

When these ferroelectric liquid crystal compounds are used in optical switching elements, etc., they are required to have various characteristics such as an operating temperature in the vicinity of or not higher than room temperature, a wide operating temperature range, a high switching speed (quick), and a switching threshold value voltage value in an appropriate range. Of these characteristics, the operating temperature range is a particularly important property when the ferroelectric liquid crystal compounds are put into practical use.

So far as ferroelectric liquid crystal compounds known hitherto are concerned, however, they have drawbacks such as a generally narrow operating temperature range, and an operating temperature range in the high temperature region not including room temperature even when their operating temperature range is wide, as disclosed, for example, in R. B. Meyer et al., J. de Phys., Vol. 36 L, p 69 (1975) and a paper reported by Masaaki Taguchi and Takamasa Harada, "Proceedings of Eleventh Conference on Liquid Crystal" p 168 (1985). Thus, there are no available ferroelectric liquid crystal compounds that are satisfactory from the standpoint of practical use.

OBJECT OF THE INVENTION

An object of the present invention is to provide a novel liquid crystal element, a process for manufacturing the liquid crystal element, and uses thereof, and more in detail to provide a liquid crystal element significantly excellent in liquid crystal characteristics such as an especially wide operating temperature range, a high switching speed, an appropriate switching threshold voltage and an extremely small amount of power consumption.

Another object of the present invention is to provide a process for manufacturing such a novel liquid crystal element, and uses thereof.

SUMMARY OF THE INVENTION

A liquid crystal racemic mixture of the invention is represented by the following formula [I]:

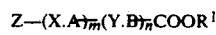

wherein R1 is a group selected from the group consisting of a branched alkyl group having 4 to 20 carbon atoms, a branched alkoxy group having 4 to 20 carbon atoms and a halogenated alkyl group which may be branched and which has 3 to 20 carbon atoms, X and Y are each independently a group selected from the group consisting of $-COO-$, $-OCO-$, $-CH_2CH_2-$, $-CH_2O-$, $-OCH_2-$, $-COCH_2-$, $-CH_2CO-$ and $-S-S-$, or a single bond.

A and B are each independently a group selected from the group consisting of

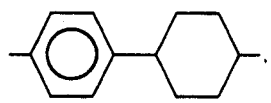

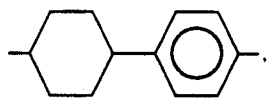

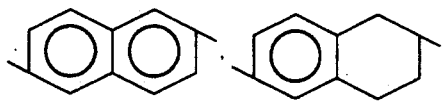

Z is a group selected from the group consisting of

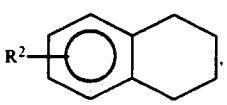

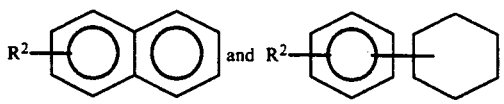

(wherein R² is each independently a group selected from the group consisting of an alkyl group having 3 to 20 carbon atoms, an alkoxy group having 3 to 20 carbon atoms and a halogenated alkyl group having 3 to 20 carbon atoms), and m and n are each independently an integer of 0 to 2 (m and n not being simultaneously 0).

A liquid crystal composition of the invention comprises a liquid crystal racemic mixture represented by the formula [I].

A liquid crystal element of the invention comprises a cell which includes two substrates facing each other and having a gap therebetween, and a liquid crystal material filled in the gap, wherein said substrates have an orientation control film placed on the surface, which directly faces the liquid crystal material, of at least one of the substrates, and said liquid crystal material comprising a racemic mixture represented by the formula [I].

The liquid crystal display device and liquid crystal display element of the invention are prepared with the liquid crystal element as described above.

A process for manufacturing a liquid crystal element of the invention comprising a cell which includes two substrates facing each other and having a gap therebetween, and a liquid crystal material filled in the gap of said cell, comprises preparing a cell having an orientation control film on the surface of at least one of the substrates, said surface facing the liquid crystal material, filling the gap of said cell with a liquid crystal material comprising a liquid crystal racemic mixture represented by the above-mentioned formula [I], and cooling said cell from a temperature being not lower than the temperature at which the liquid crystal material begins to show an isotropic phase to a temperature being not higher than the temperature at which the liquid crystal material begins to show a liquid crystal phase.

DETAILED DESCRIPTION OF THE INVENTION

Figure 1:
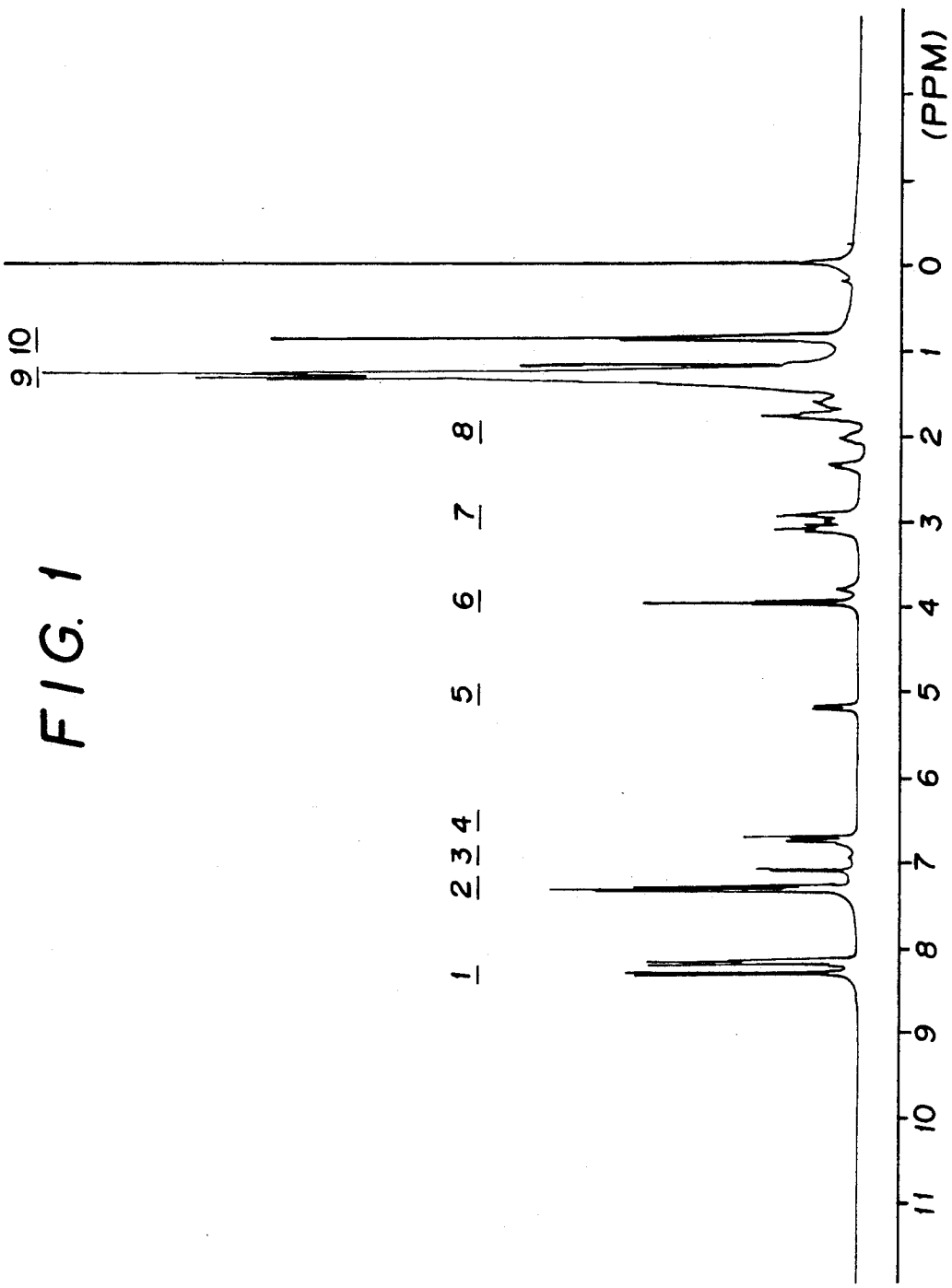
FIG. 1 is a chart showing the ¹H-NMR spectrum of 1″-methylheptyl 4-(1′,2′,3′,4′-tetrahydro-6′-n-decyloxy-2′-naphthoyloxy)benzoate (compound exemplified by the formula [A-6]).

The liquid crystal racemic mixture, the liquid crystal composition and the liquid crystal element of the present invention, the process for manufacturing the liquid crystal element, and uses of the liquid crystal element are concretely illustrated hereinafter.

The liquid crystal racemic mixture of the invention is represented by the following formula [I]:

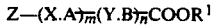

wherein R¹ is a group selected from the group consisting of a branched alkyl group having 4 to 20 carbon atoms, a branched alkoxy group having 4 to 20 carbon atoms and a halogenated alkyl group having 3 to 20 carbon atoms which may be branched. In the present invention, R¹ is particularly preferably a branched alkyl group of 4 to 20 carbon atoms or a branched halogenated alkyl group of 3 to 20 carbon atoms. That is, a part of hydrogen atoms bonded to the carbon atoms of the alkyl group are preferably replaced with halogen atoms, and the alkyl group or the halogenated alkyl group is particularly preferably branched. Preferable examples of the alkyl group and halogenated alkyl group include

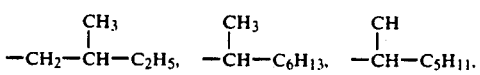

In the formula [I], the group represented by R1 can be introduced into the precursor acid by esterification reaction of the acid with, for example, an alkyl ester of hydroxybenzoic acid. Of the alkyl esters of hydroxybenzoic acid used in the esterification reaction, alkyl esters of hydroxybenzoic acid prepared by biochemical synthesis each have an asymmetric carbon atom. As a result, the compounds of formula [I] prepared with the biochemically synthesized alkyl esters come to show an optical activity. However, when such alkyl ester compounds are purely chemically synthesized, a d-form showing a right optical rotation and a l-form showing a left optical rotation are formed in the same proportion. As the result of using such a hydroxybenzoic acid alkyl ester containing the d-form and l-form in the same proportion, the resultant compound of the formula [I] becomes a racemic mixture showing no optical rotation and no optical activity. Accordingly, the liquid crystal racemic mixture represented by the formula [I] and used in the invention contains in the same proportion a d-form compound having R1 group and a l-form compound having R1 group. Though the compound containing a d-form and a l-form in the same proportion can be prepared, for example, by separately preparing the alkyl d-hydroxybenzoate and the alkyl l-hydroxybenzoate, mixing these esters in the same proportion, and performing the esterification reaction with the resultant ester, the compound is advantageously prepared by preparing the alkyl hydroxybenzoate containing a d-form and a l-form in the same proportion, and performing the esterification reaction with the resultant ester.

In the formula [I], X and Y are each independently a group selected from the group consisting of —COO—, —OCO—, —CH$_2$CH$_2$—, —CH$_2$O—, —OCH$_2$—, —COCH$_2$—, —CH$_2$CO— and —S—S—, or a single bond. Of these, at least either X or Y is preferably —COO— when the linearity of the compound is considered, and it is particularly preferable that both X and Y are —COO—.

Further, A and B in the formula [I] are each independently a group selected from the group consisting of

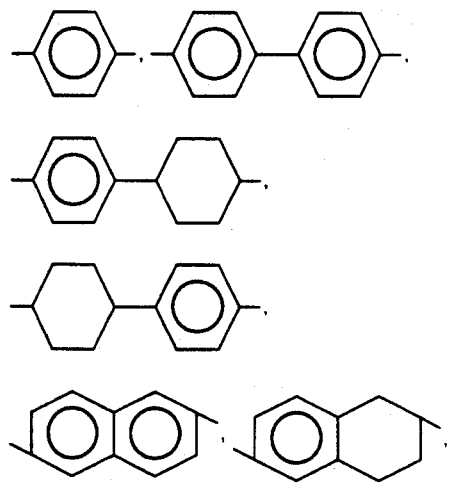

Of these, A and B are preferably

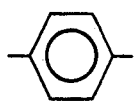

namely, 1,4-phenylene group.

In the formula [I], m and n are each independently an integer of 0 to 2 (m and n being not simultaneously 0).

Of the liquid crystal racemic compounds, liquid crystals of compounds having m being 1 or 2 are particularly excellent.

Z in the formula [I] represents either one of the following group:

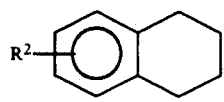

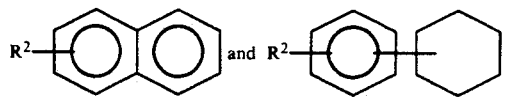

wherein R$^2$ is each independently selected from the group consisting of an alkyl group having 3 to 20 carbon atoms, an alkoxy group having 3 to 20 carbon atoms and a halogenated alkyl group having 3 to 20 carbon atoms.

Accordingly, examples of the liquid crystal racemic mixture of the invention represented by the formula [I] include a liquid crystal racemic mixture represented by the formula [I-A], a liquid crystal racemic mixture represented by the formula [I-B] and a liquid crystal racemic mixture represented by the formula [I-C]

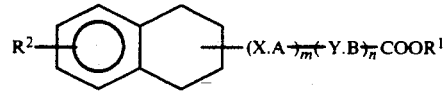 [I-A]

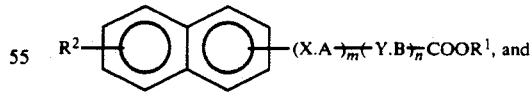 [I-B]

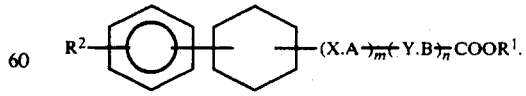 [I-C]

When the racemic mixture of the formula I] is a racemic mixture of the formula [I-A], examples of the 1,2,3,4-tetrahydronaphtyl group include 1,2,3,4-tetrahydro-1,5-naphtyl, 1,2,3,4-tetrahydro-1,6-naphtyl, 1,2,3,4-tetrahydro-2,6-naphtyl and 1,2,3,4-tetrahydro-1,7-naphtyl.

In the present invention, the entire molecular form of the racemic mixture is preferably linear, and therefore 1,2,3,4-tetrahydro-2,6-naphtyl is particularly preferable as the naphtyl group.

When the racemic mixture of the formula [I] is a racemic mixture of the formula [I-B], examples of the naphtyl group include 1,5-naphtyl, 1,6-naphtyl, 2,6-naphtyl and 1,7-naphtyl In the present invention, the entire molecular form of the racemic mixture is preferably linear, and therefore 2,6-naphtyl is particularly preferable.

Further, when the racemic mixture of the formula [I] is a racemic mixture of the formula [I-C], examples of the phenylcyclohexyl group include 1,4-phenyl-trans-1,4-cyclohexyl, 1,4-phenyl-cis-1,4-cyclohexyl, 1,3-phenyl-trans-1,3-cyclohexyl and 1,3-phenyl-cis-1,3-cyclohexyl. In the present invention, the entire structure of the molecules is preferably linear. Accordingly, as the phenylcyclohexyl group, 1,4-phenyl-trans-1,4-cyclohexyl is particularly preferable. Further, though the phenylcyclohexyl group may be either a cis-form or a trans-form, a trans-form is preferable when the linearity of the molecule is especially considered.

In the formulas [I-A], [I-B] and [I-C] described above, $R^2$ is a group selected from the group consisting of an alkyl group having 3 to 20 carbon atoms, an alkoxy group having 3 to 20 carbon atoms and a halogenated alkyl group having 3 to 20 carbon atoms.

When R2 in the formula [I] is an alkyl group having 3 to 20 carbon atoms, the alkyl group may be either a linear form, a branched chain form or a cycloalkyl form. A carboxylic acid ester molecule with $R^2$ being a straight-chain alkyl group, however, exhibit excellent liquid crystal properties due to the linearly extended rigid straight structure of the molecule. An alkyl group having 3 to 20 carbon atoms is preferable as the linear straight chain alkyl group as described above. Concrete examples of the alkyl group include hexyl, heptyl, octyl, decyl, dodecyl, tetradecyl, hexadecyl and octadecyl.

When $R^2$ is a halogenated alkyl group of 3 to 20 carbon atoms, examples of the halogenated alkyl group include a group prepared by replacing at least a part of the hydrogen atoms of the alkyl group as described above with halogen such as F, Cl, Br and I.

When $R^2$ is an alkoxy group having 3 to 20 carbon atoms, examples of the alkoxy group include such alkoxy groups having an alkyl group as described above. Concrete examples of the alkoxy group include hexyloxy, heptyloxy, octyloxy, decyloxy, dodecyloxy, tetradecyloxy, heptadecyloxy, hexadecyloxy and octadecyloxy.

Of the liquid crystal racemic mixtures having R2 as described above, those having alkoxy group exhibit particularly excellent liquid crystal properties.

Of the liquid crystal racemic mixtures represented by the formula [I], concrete preferable examples of the racemic mixtures of the formula [I-A] include racemic mixtures each represented by the following formulas [A-1] to [A-16].

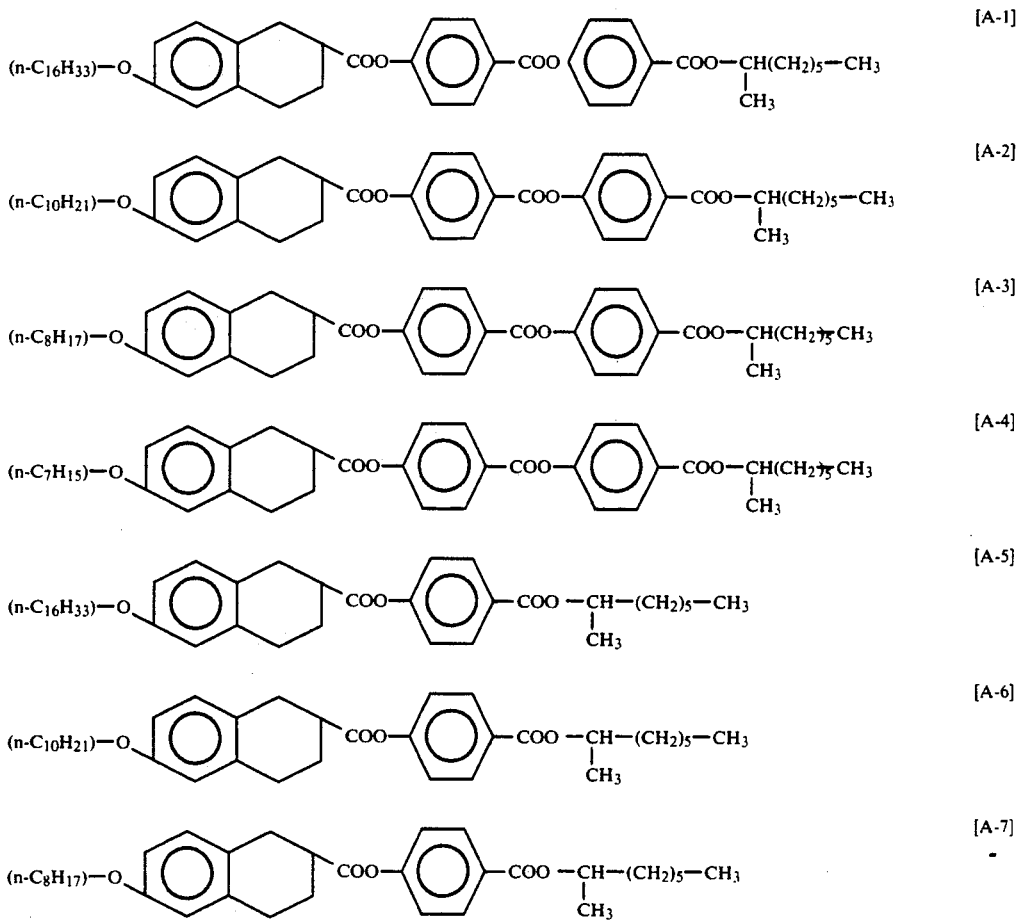

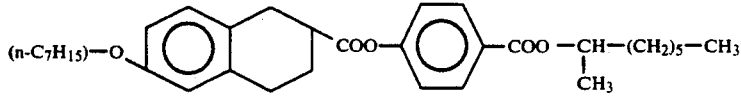
[A-8]
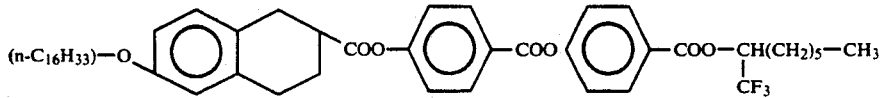
[A-9]
[A-10]
[A-11]
[A-12]
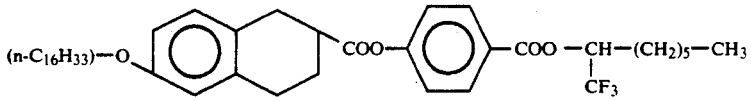
[A-13]
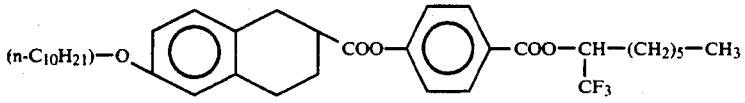
[A-14]
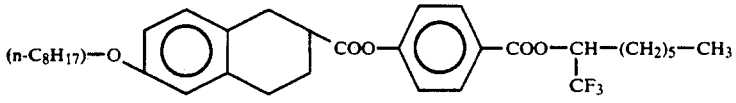
[A-15]
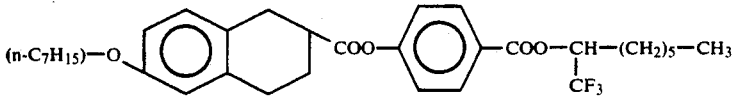
[A-16]
Preferably concrete examples of the racemic mixtures represented by the formula [I-B] include racemic mixtures represented by the following formulas [B-1] to [B-16]:
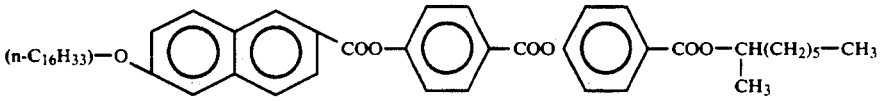
[B-1]
[B-2]
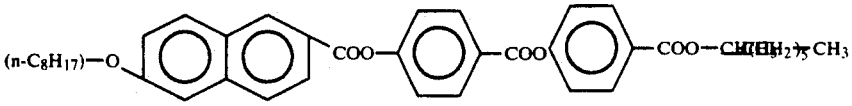
[B-3]

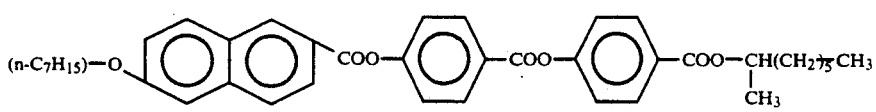
[B-4]
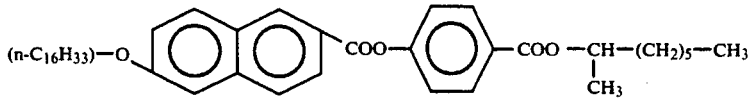
[B-5]
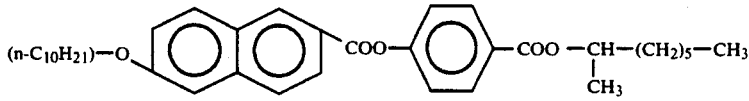
[B-6]
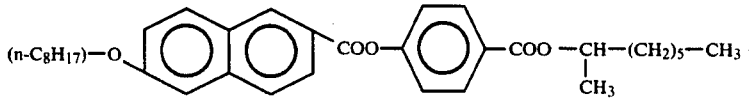
[B-7]
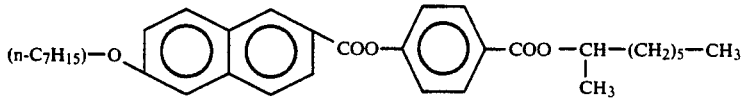
[B-8]
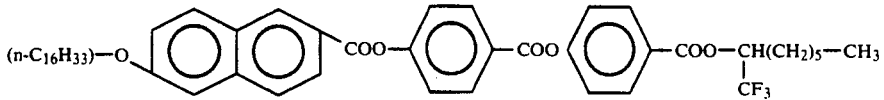
[B-9]
[B-10]
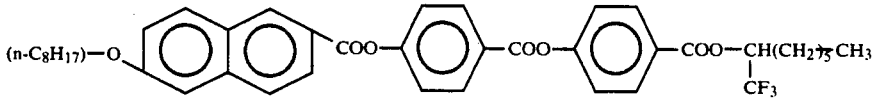
[B-11]
[B-12]
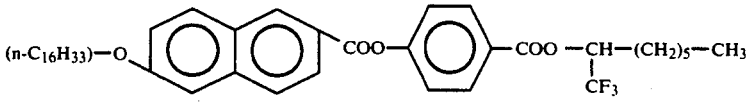
[B-13]
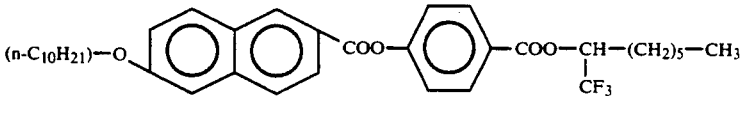
[B-14]
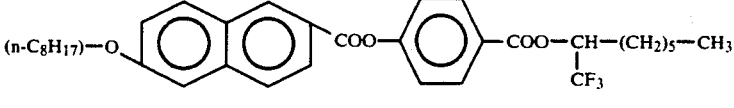
[B-15]
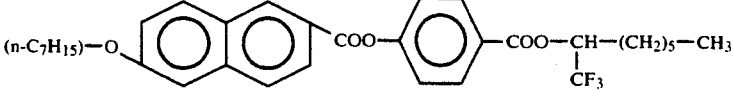
[B-16]

Preferably concrete examples of the racemic mixtures represented by the formula [I-C] include racemic mixtures represented by the formula [C-1] to [C-16]:
[C-1]
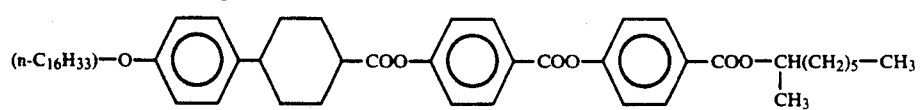
[C-2]
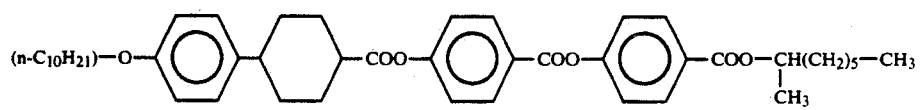
[C-3]
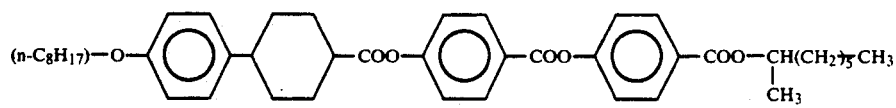
[C-4]
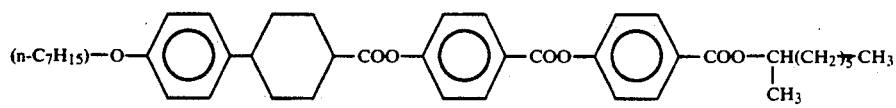
[C-5]
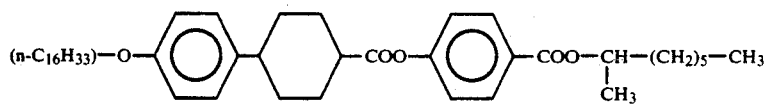
[C-6]
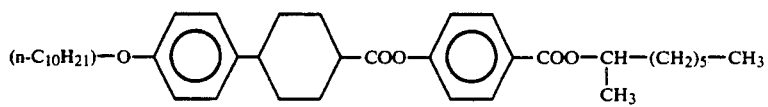
[C-7]
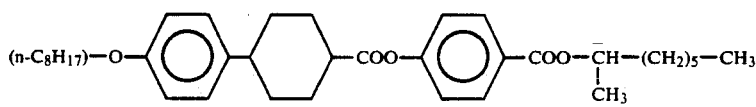
[C-8]
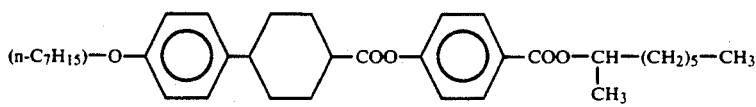
[C-9]
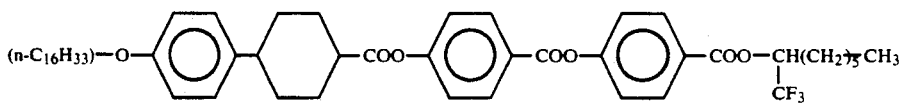
[C-10]
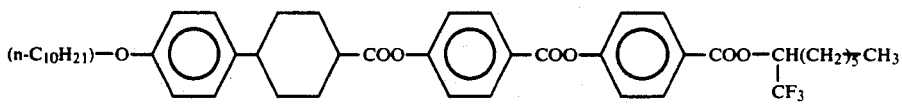
[C-11]
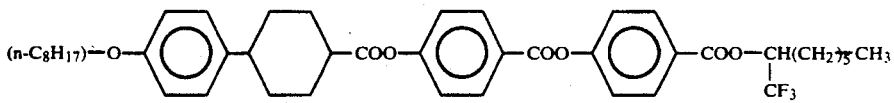
[C-12]
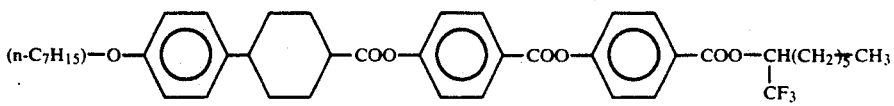
[C-13]
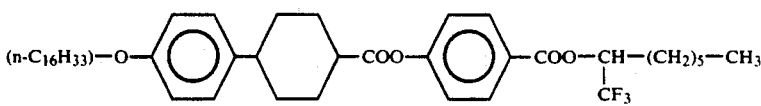

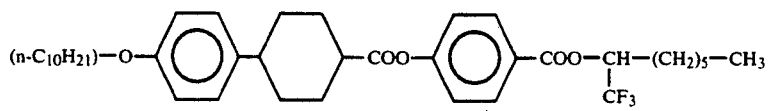 [C-14]

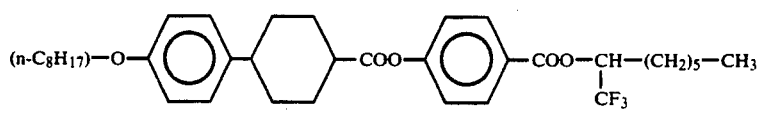 [C-15]

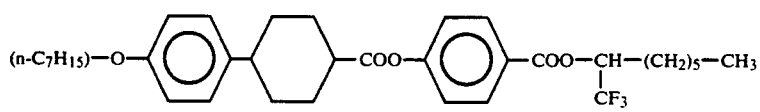 [C-16]

A liquid crystal racemic mixture represented by the formula [I-A] can be manufactured by known synthetic techniques in combination.

For example, a racemic mixture represented by the formula [I-A] can be synthesized through the synthetic route as illustrated below.

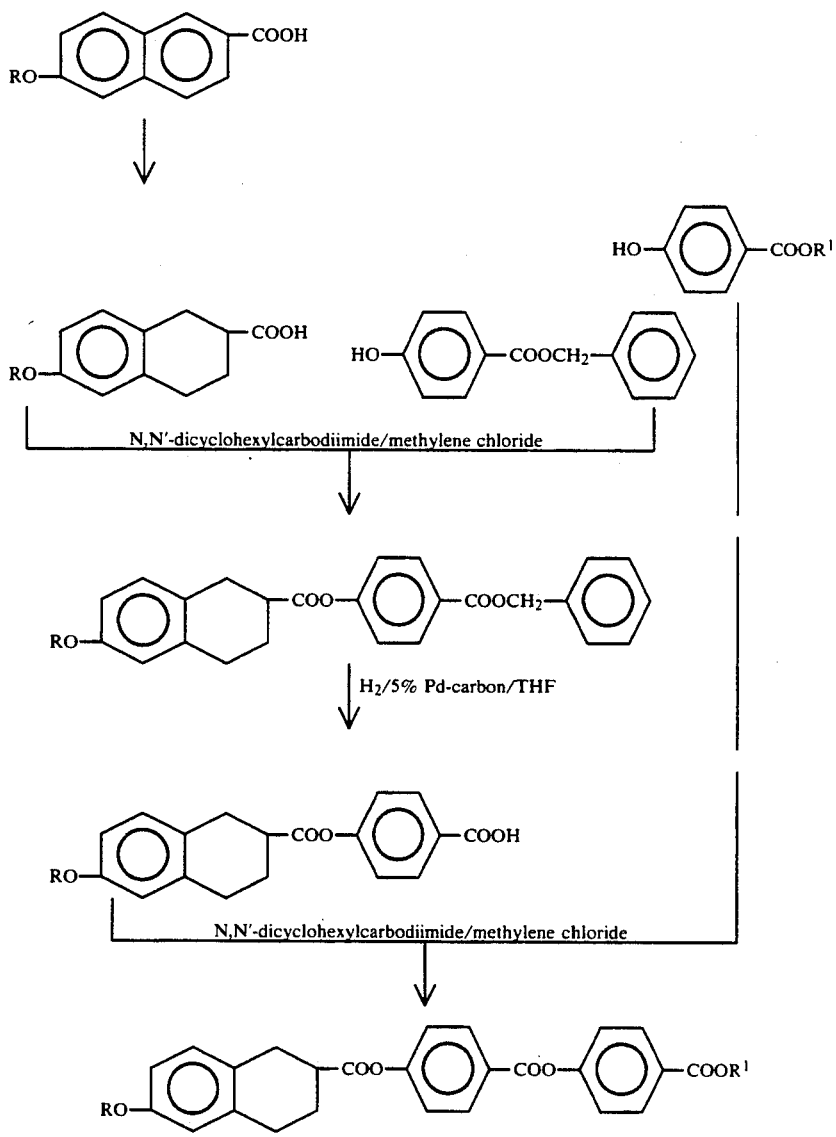

That is, for example, a mixture of an alkoxynaphthalenecarboxylic acid derivative such as 6-n-alkoxynaphthalene-2-carboxylic acid and an alkoxyalkyl such as 1,2-ethoxyethane is refluxed in the presence of metallic sodium while an alcohol such as isoamyl alcohol is added dropwise to obtain a naphthalenecarboxylic acid derivative whose ring is prepared by hydrogenating one of the naphthlene compound ring, such as 1,2,3,4-tetrahydro-6-n-4-alkoxynaphthalene-2-carboxylic acid.

The thus obtained hydrogenated naphthalenecarboxylic acid derivative, namely, 1,2,3,4-tetrahydro-6-n-4-alkoxynaphthalene-2-carboxylic acid is allowed to react with a hydroxy group-containing aromatic ester such as benzyl 4-hydroxybenzoate in an organic solvent such as 4-N,N-dimethylaminopyridine and methylene chloride while a halogenated hydrocarbon (for example, methylene chloride) solution containing an imide such as N,N'-dicyclohexylcarbodiimide is added drop-
wise to obtain the ester of the hydrogenated naphthalenecarboxylic acid derivative and the hydroxy group-containing aromatic ester [namely, 4-(6'-n-alkoxy-2'-naphthoyloxy)aromatic acid benzyl ester when the above-exemplified compounds are used].

The thus obtained ester [namely, benzyl 4-(6'-n-alkoxy-'-naphthoyloxy)benzoate] is placed in a polar solvent such as tetrahydrofuran, and reduced with hydrogen in the presence of a reducing catalyst such as palladium/carbon to obtain an aromatic carboxylic acid derivative [namely, 4-(6'-n-alkoxy-2'-naphthoyloxy)benzoic acid].

Subsequently, an ester formed from hydroxybenzoic acid and an alcohol having a group corresponding to R1 is allowed to react with an aromatic carboxylic acid derivative obtained in the above-described process [namely, 4-(6'-n-alkoxy-2'-naphthoyloxy)benzoic acid] in a halogenated solvent such as methylene chloride in the presence of a heterocylic compound such as 4-N,N-dimethylaminopyridine while a halogenated hydrocarbon solution (e.g. methylene chloride solution) containing an imide such as N,N'-dicyclohexylcarbodiimide is dropped to obtain a liquid crystal racemic mixture represented by the formula [I-A].

As the alcohol having a group corresponding to $R^1$ in the formula [I-A], there is used an alcohol containing a d-form and a l-form in about the same proportion.

Furthermore, a liquid crystal racemic mixture represented by the formula [I-B] can be synthesized, for example, through the synthetic route illustrated below.

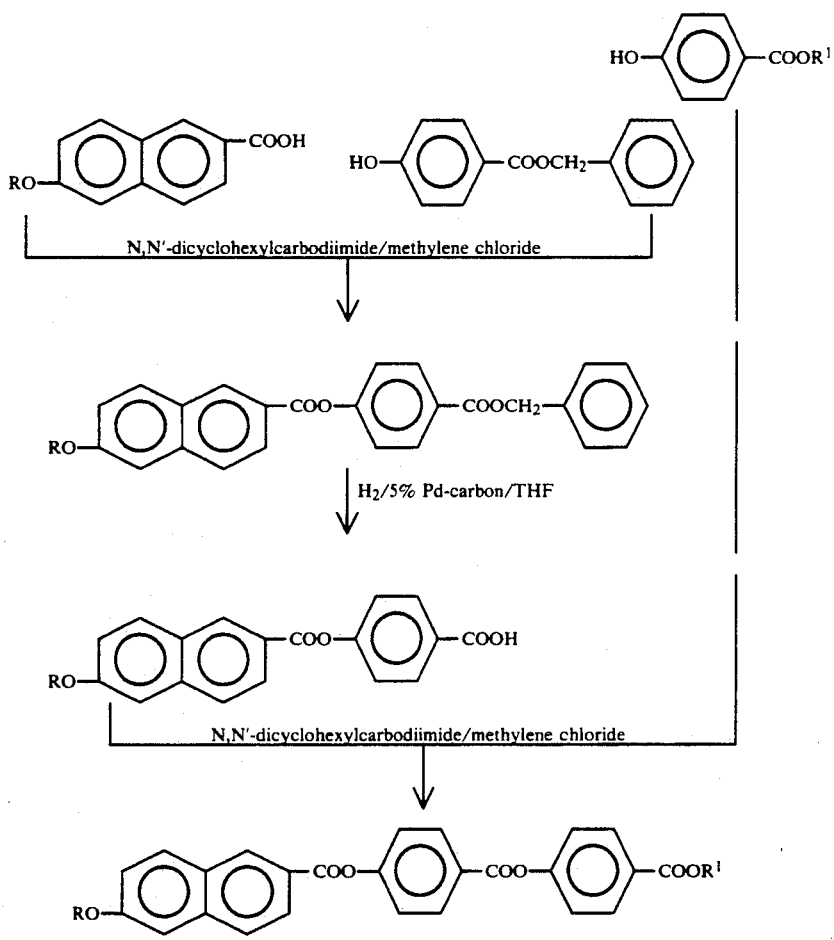

This is, a naphthalenecarboxylic acid derivative (namely, 6-n-4-alkoxynaphthalene-2-carboxylic acid) is allowed to react with a hydroxy group-containing aromatic ester such as benzyl 4-hydroxybenzoate in an organic solvent such as 4-N,N-dimethylaminopyridine and methylene chloride while a halogenated hydrocarbon (for example methylene chloride) solution containing an imide such as N,N'-dicyclohexylcarbodiimide dicyclohexylcarbodiimide is added dropwise to obtain the ester of the naphthalenecarboxylic acid derivative and the hydroxy group-containing aromatic ester [namely, benzyl 4-(6'-n-alkoxy-2'-naphthoyloxy)benzoate when the above-exemplifeid compounds are used].

The thus obtained ester [namely, benzyl 4-(6'-n-alkoxy-2'-naphthoyloxy)benzoate] is placed in a polar solvent such as tetrahydrofuran, and reduced with hydrogen in the presence of a reducing catalyst such as palladium/carbon to obtain an aromatic carboxylic acid derivative [e.g., 4-(6'-n-alkoxy-2'-naphthoyloxy)benzoic acid].

An ester formed from hydroxybenzoic acid and an alcohol having a group corresponding to $R^1$ is allowed to react with an aromatic carboxylic acid derivative obtained in the above-described process [namely, 4-(6'-n-alkoxy-2'-naphthoyloxy)benzoic acid] in a halogenated solvent such as methylene chloride in the presence of a heterocylic compound such as 4-N,N-dimethylaminopyridine while a halogenated hydrocarbon solution (e.g. methylene chloride solution) containing an imide such as N,N'-dicyclohexylcarbodiimide is dropped to obtain a liquid crystal racemic mixture represented by the formula [I-B].

As the alcohol having a group corresponding to $R^1$ in the formula [I-B], there is used an alcohol containing a d-form and a l-form in about the same proportion.

Furthermore, a liquid crystal racemic mixture represented by the formula [I-C] can be synthesized, for example, by the synthesis route illustrate below.

4-(4'-alkoxyphenyl cyclohexanecarboxylate when the above-exemplified compounds are used].

During the reaction, it is preferable that a pyridine derivative such as 4-N,N-dialkylaminopyridine is incorporated.

The thus obtained ester of the cyclohexanecarboxylic acid derivative and the hydroxy group-containing aromatic ester [4"-benzyloxycarbonylphenyl 4-(4'-alkoxyphenyl)cyclohexanecarboxylate when the above-exemplified compounds are used] is contacted with hydrogen in the presence of a reduction catalyst such as palladium/carbon to be reduced and freed from benzyl group, and to obtain such a compound having a carboxyl end group as 4"-oxycarbonylphenyl 4-(4'-alkoxyphenyl)cyclohexanecarboxylate.

The thus obtained compound [4"-oxycarbonylphenyl 4-(4'-alkoxyphenyl)cyclohexanecarboxylate when the above-exemplified compounds are used] having a carboxyl end group is esterified with an alcohol having a group corresponding to $R^1$ in a reaction solvent such as methylene chloride in the presence of an esterifying agent such as N,N'-dicyclohexylcarbodiimide to obtain a liquid crystal racemic mixture, an end product, represented by the formula [I-C].

A pyridine derivative such as 4-N,N-dialk-

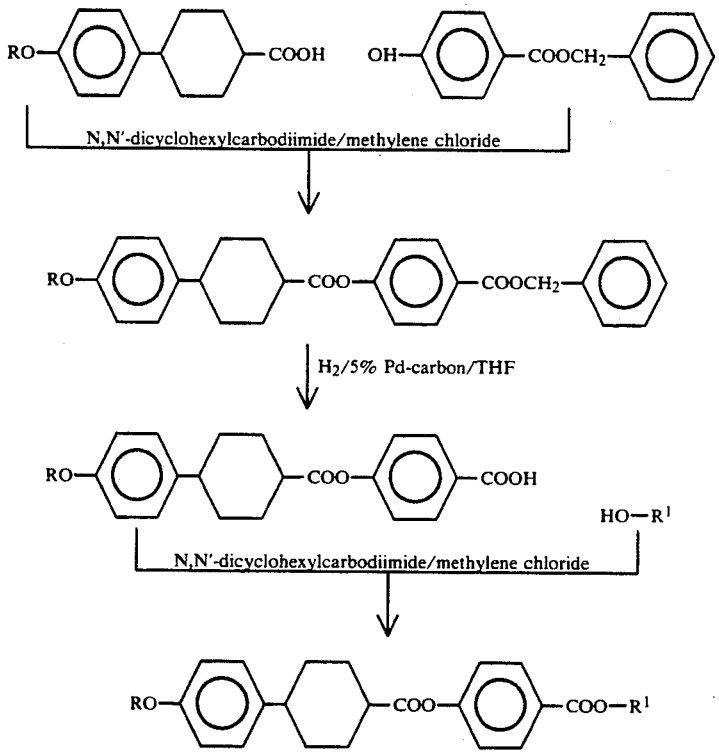

That is, a cyclohexanecarboxylic acid derivative (e.g., trans-4-(4'-alkoxyphenyl)cyclohexanecarboxylic acid] is allowed to react with a hydroxy group-containing aromatic ester such as p-hydroxybenzoic acid benzyl ester in an organic solvent such as 4-N,N-dimethylaminopyridine and methylene chloride while a halogenated hydrocarbon (e.g., methylene chloride) solution containing an imide such as N,N'-dicyclohexylcarbodiimide is added to obtain the ester of the cyclohexanecarboxylic acid derivative and the hydroxy group-containing aromatic ester [4"'-benzyloxycarbonylphenyl ylaminopyridine may also be additionally used in this reaction.

An alcohol containing a d-form and a l-form in the same proportion is used as the alcohol having a group corresponding to $R^1$ in the formula [I-C].

The above-mentioned process is given as an example of processes for manufacturing liquid crystal racemic mixtures of the invention, and it should be construed that the liquid crystal racemic mixtures of the invention is in no way limited to those manufactured by this process.

FIG. 1 shows as an example the ¹H-NMR spectrum chart of 1'''-methylhepthyl 4-[4'-(1'',2'',3'',4''-tetrahydro-6''-n-decyloxy-2''-naphthoyloxy)benzoyloxy]benzoate which is represented by the following formula [A-2] and which is among liquid crystal racemic mixtures manufactured by such a process as described above and represented by the formula [I-A].

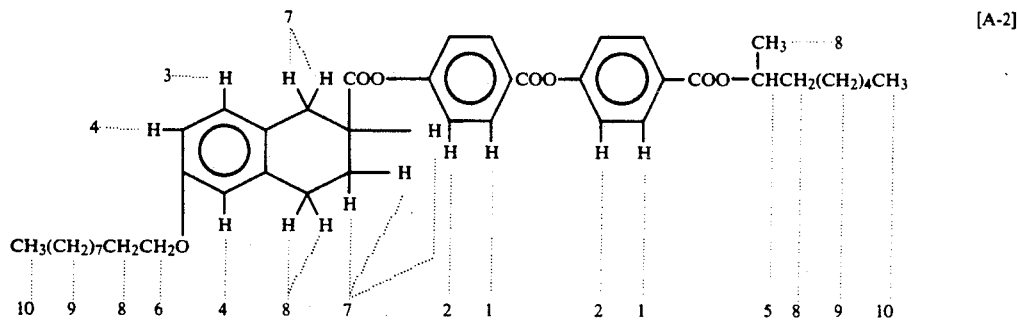

In the formula [A-2], the serial numbers 1 to 10 indicate either one or either ones of the hydrogen atoms of the ester, and each of the numbers corresponds to the same number attached to either one of the peaks shown in FIG. 1.

Figure 2:
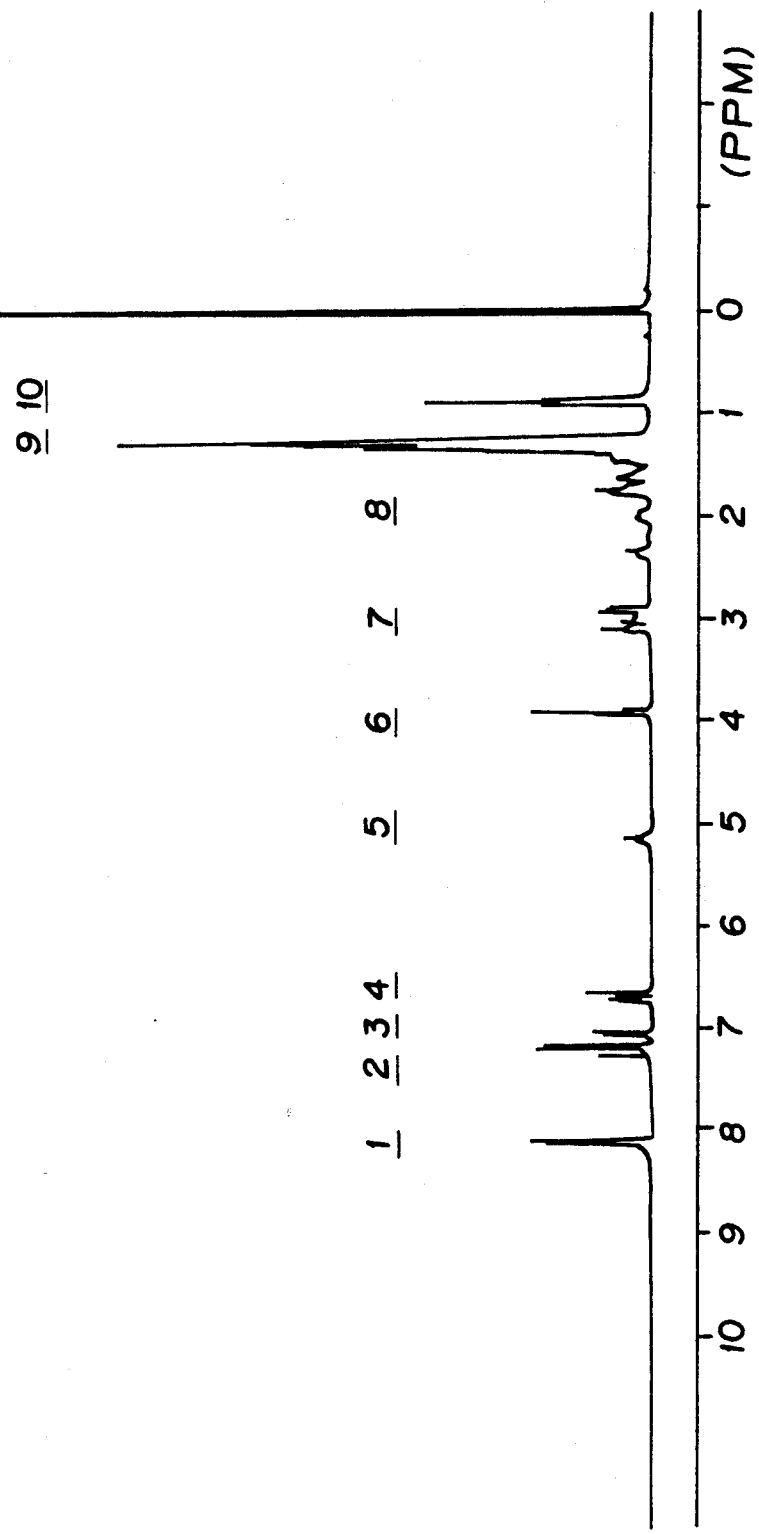
FIG. 2 is a chart showing the ¹H-NMR spectrum of 1″-trifluoromethylhepthyl 4-(1′,2′,3′,4′-tetrahydro-6′-n-decyloxy-2′-naphthoyloxy)benzoate (compound exemplified by the formula [A-14]).

FIG. 2 shows the ¹H-NMR spectrum chart of 1''-methylhepthyl 4-(1',2',3',4'-tetrahydro-6'-n-decyloxy-2'-naphthoxyloxy)benzoate represented by the following formula [A-6].

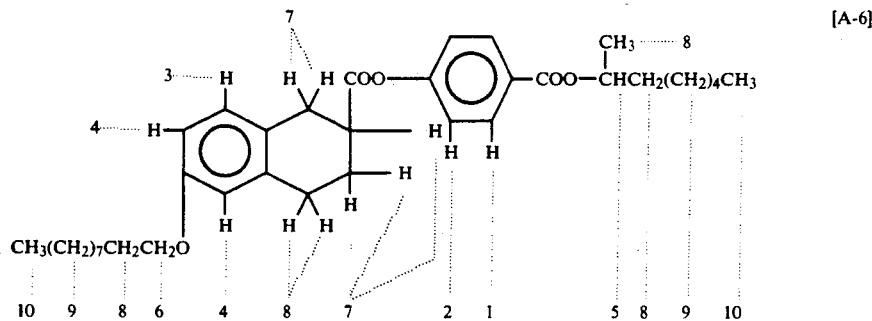

In the formula [A-6], the serial numbers 1 to 10 indicate either one or either ones of the hydrogen atoms of the ester, and each of the numbers corresponds to the same number attached to either one of the peaks shown in FIG. 2.

Figure 3:
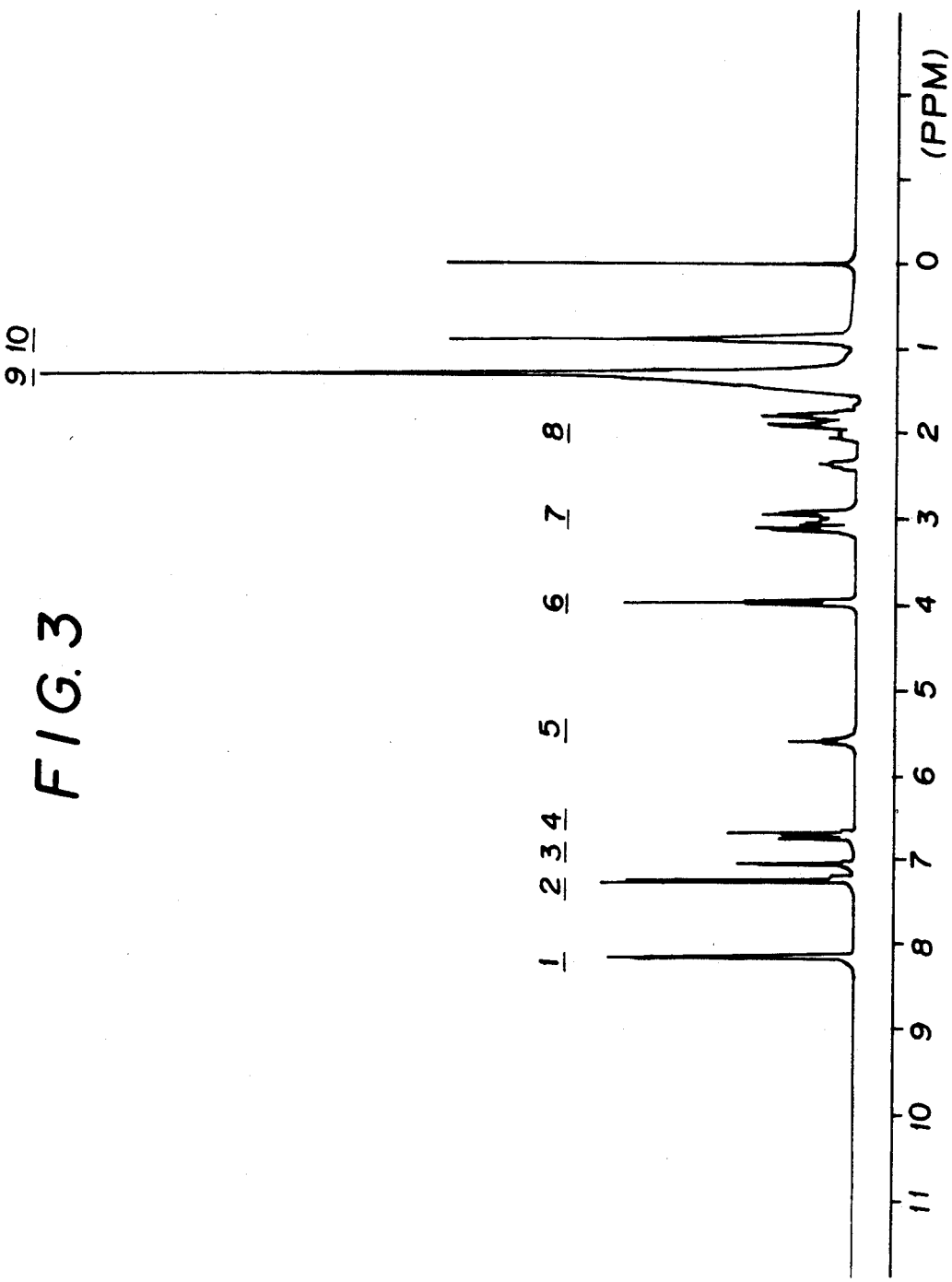
FIG. 3 is a chart showing the ¹H-NMR spectrum of 1″-methylheptyl 4-[4′-(1″,2″,3″,4″-tetrahydro-6″-n-decyloxy-2″-naphthoyloxy)benzoyloxy]benzoate (compound exemplified by the formula [A-2]).

FIG. 3 shows the ¹H-NMR spectrum chart of 1''-trifluoromethylheptyl 4-(1',2',3', 4'-tetrahydro-6'-n-decyloxy-2'-naphthoyloxy)benzoate represented by the following formula [A-14].

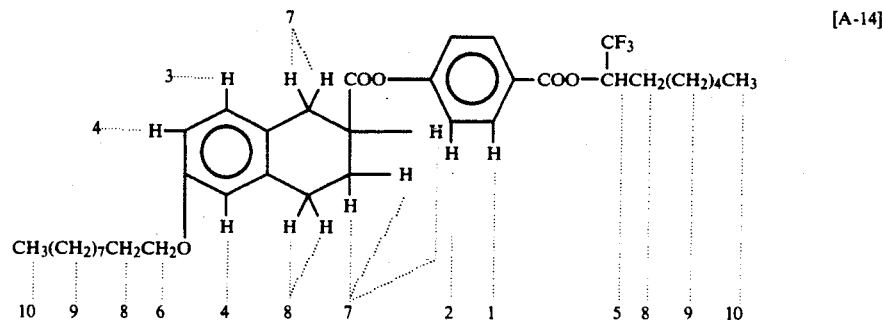

In the formula [A-14], the serial numbers 1 to 10 indicate either one or either ones of the hydrogen atoms of the ester, and each of the numbers corresponds to the same number attached to either one of the peaks shown in FIG. 3.

The liquid crystal racemic mixtures represented by the formula [I-A] and obtained as described above can be appropriately employed as liquid crystal materials.

Of the liquid crystal racemic mixtures represented by the formula [I-A] of the invention, those represented by the following formulas [A-2], [A-6] and [A-14] exhibit particularly excellent liquid crystal properties.

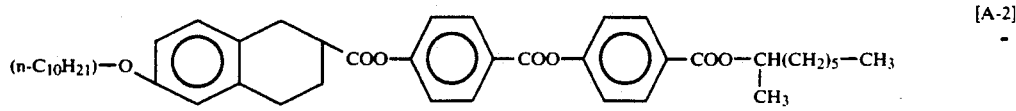

-continued

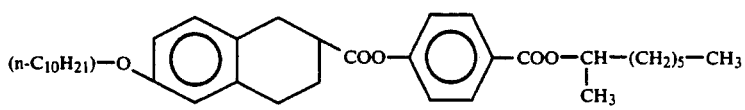

[A-6]

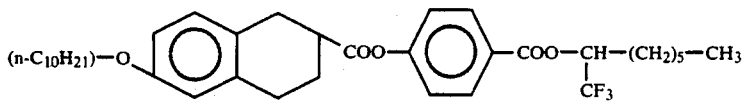

[A-14]

Table 1 shows phase transition temperatures of the three compounds which are represented by the formulas [A-2], [A-6 and [A-14], respectively and which exhibit particularly excellent properties as liquid crystals among the liquid crystal racemic mixtures of the invention. In the present invention, Cry, SmA and Iso denote a crystal phase, a smectic A phase and an isotropic liquid, respectively.

Determination of the phase transition temperatures are carried out by thermal measurement with a DSC (differential scanning calorimeter) and by measurement of the transition temperatures achieved by observation using a polarized microscope.

Figure 4:
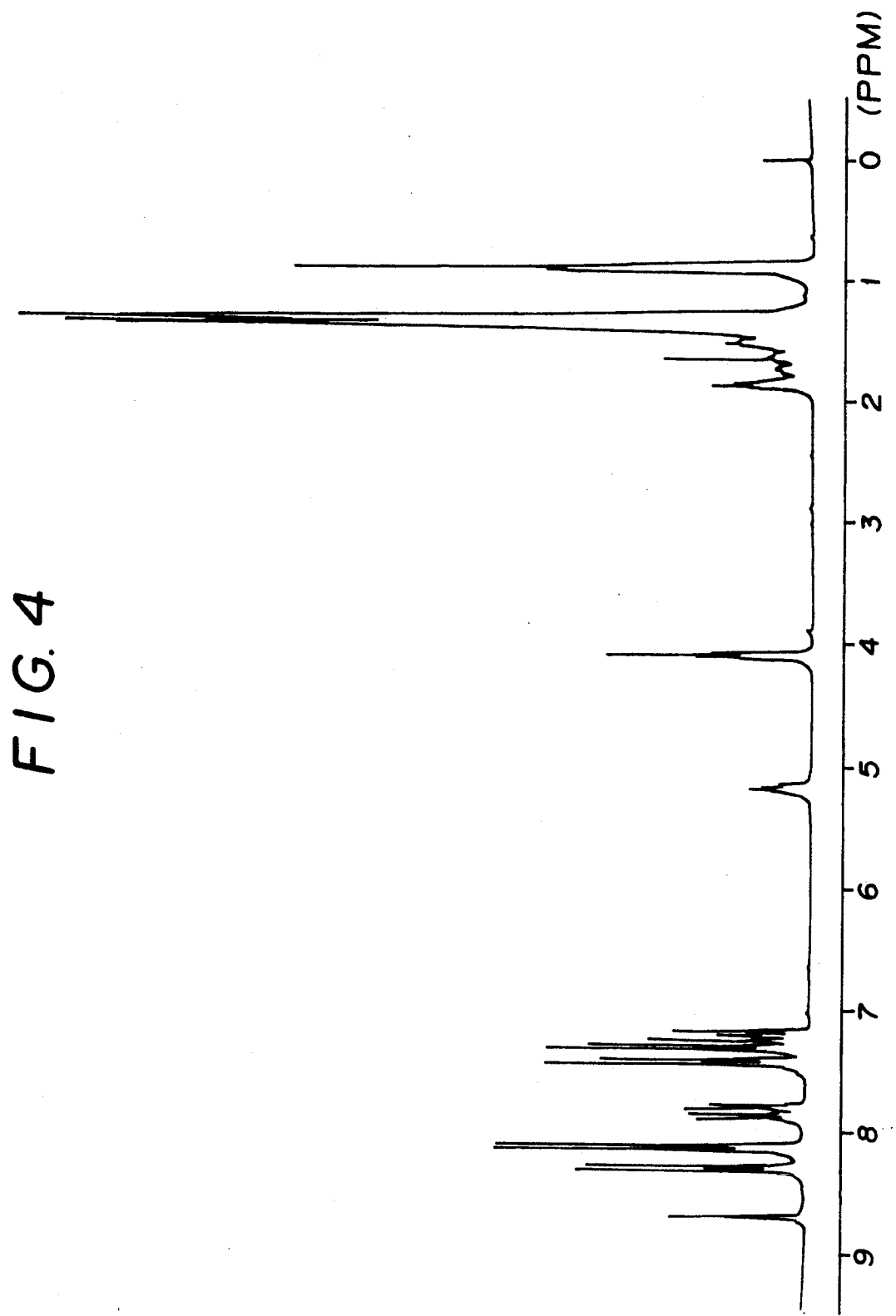
FIG. 4 is a chart showing the ¹H-NMR spectrum of 1″-methylheptyl 4-[4′-(6″-n-decyloxy-2″-naphthoyloxy)benzoyloxy]benzoate (compound exemplified by the formula [B-2]).

FIG. 4 shows the $^1$H-NMR spectrum chart of 1'''-methylheptyl 4-[4'-(6''-n-decyloxy-2''-naphthoxyloxy)-benzoyloxy]benzoate which is represented by the following formula [B-2] and which is among liquid crystal racemic mixtures represented by the formula [I-B].

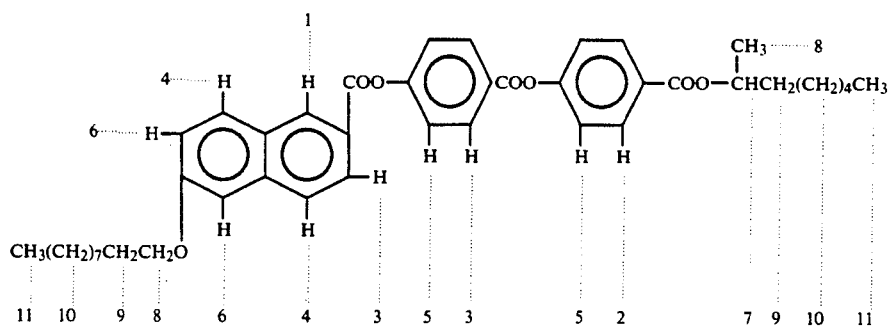

[B-2]

In the formula [B-2], the serial numbers 1 to 10 indicate either one or either ones of the hydrogen atoms of the ester, and each of the numbers corresponds to the same number attached to either one of the peaks shown in FIG. 4.

Figure 5:
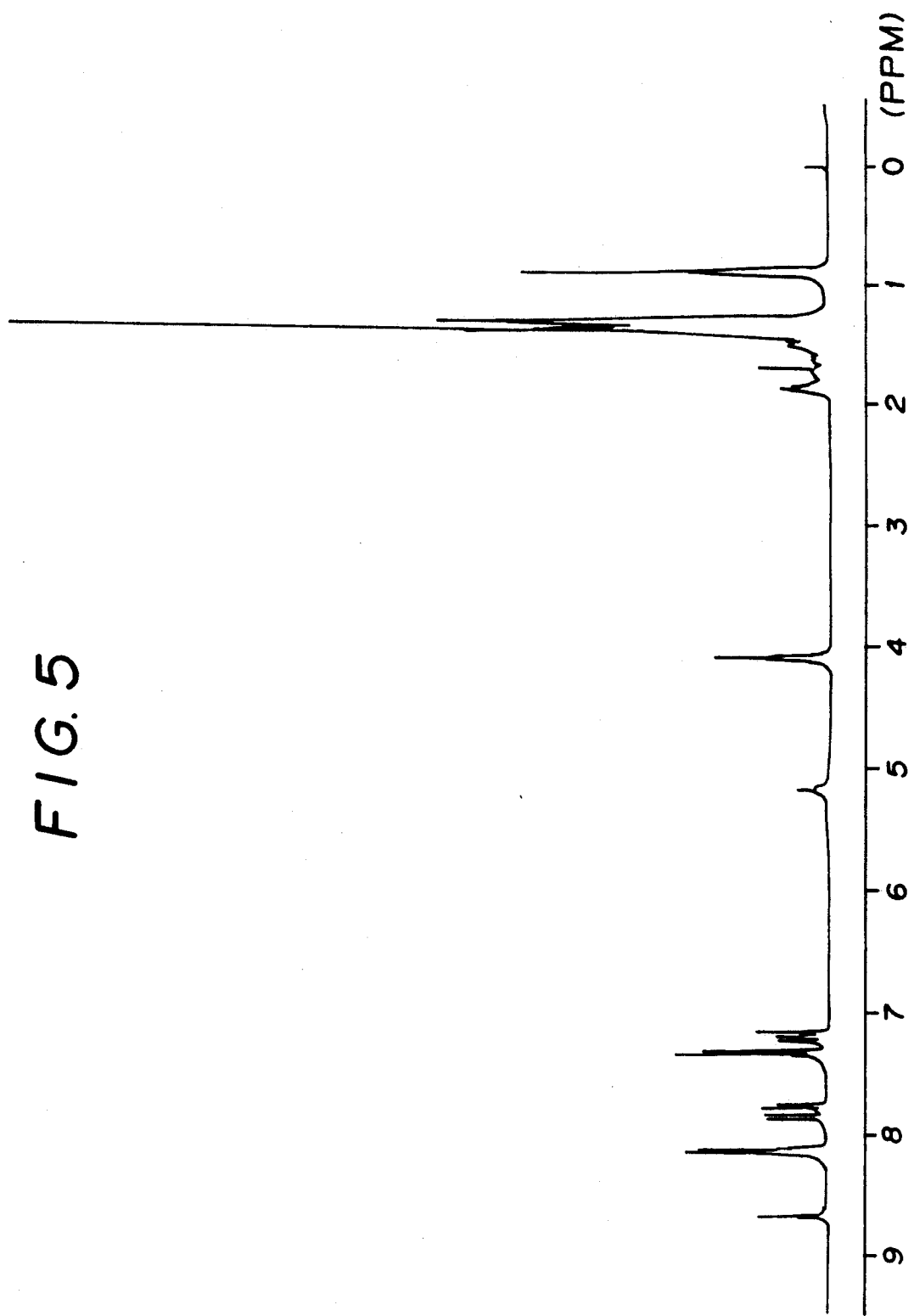
FIG. 5 is a chart showing the ¹H-NMR spectrum of 1″-methylheptyl 4-(6′-n-decyloxy-2′-naphthoyloxy)benzoate (compound exemplified by the formula [B-6]).

FIG. 5 shows the $^1$H-NMR spectrum chart of 1'''-methylheptyl 4-(6'-n-decyloxy-2'-naphthoxyloxy)benzoate represented by the following formula [B-6].

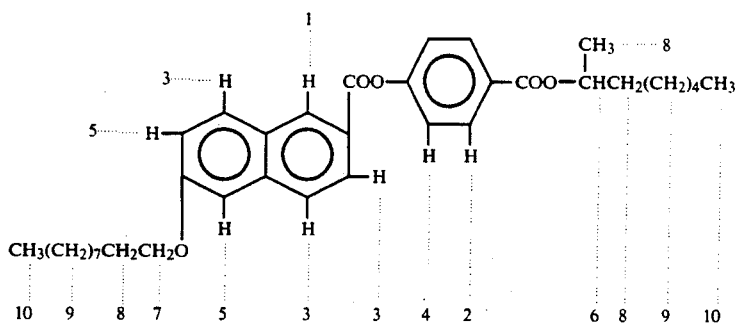

[B-6]

In the present invention, the transition temperatures from crystals (Cry-SmA or Cry-Iso) are shown after leaving the racemic mixtures for a maximum period of 20 days and confirming whether the crystallization takes place or not.

TABLE 1

| Compound | Phase transition temp. | |
|---|---|---|
| | Cry-SmA or Iso | SmA-Iso |
| [A-2] | 61° C. | 117° C. |
| [A-6] | −49° C. | 7° C. |
| [A-14] | 38° C. | |

In the formula [B-6], the serial number 1 to 10 each indicate either one or either ones of the hydrogen atoms of the ester, and each of the numbers corresponds to the same number attached to either one of the peaks shown in FIG. 5.

Figure 6:
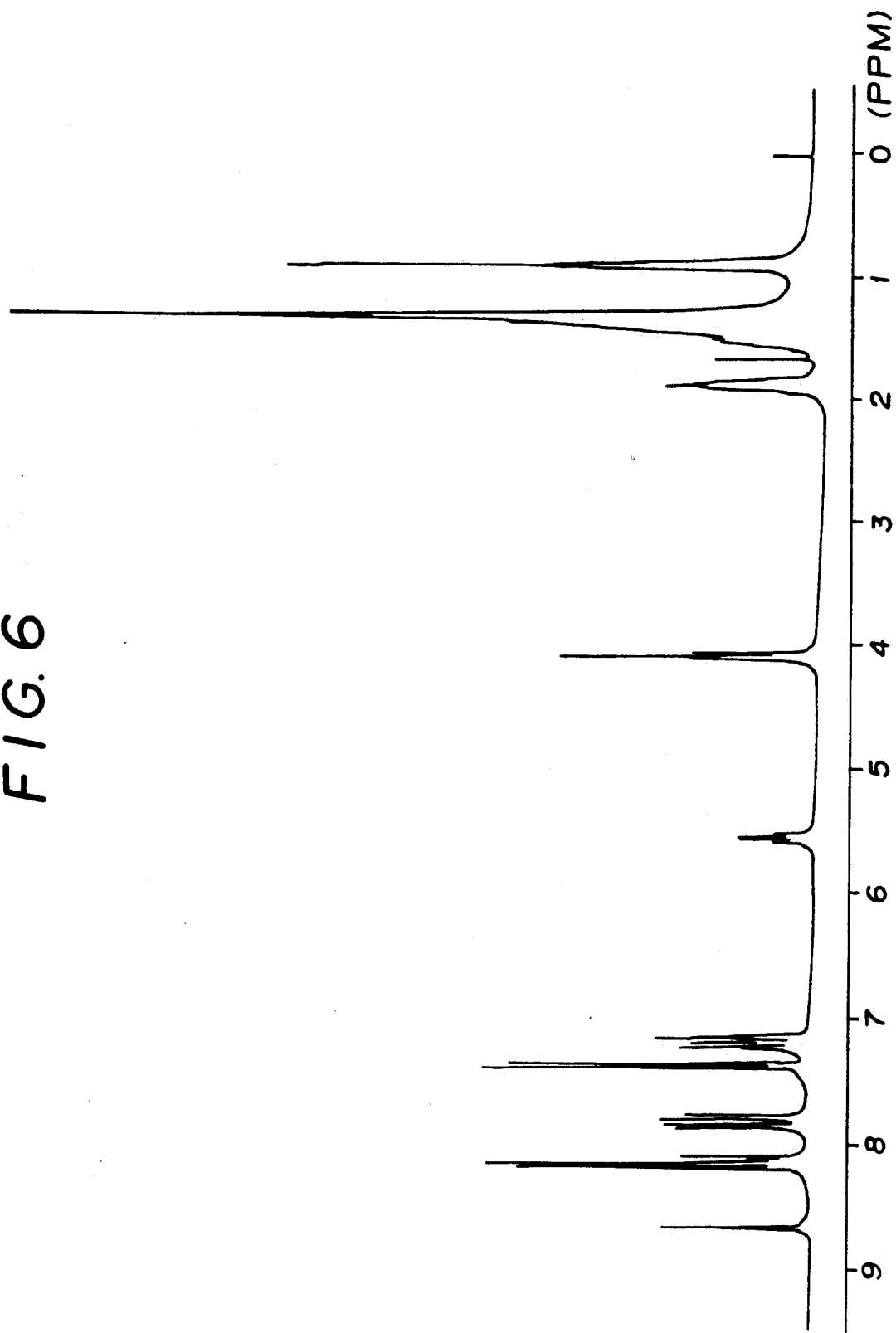
FIG. 6 is a chart showing the ¹H-NMR spectrum of 1″-trifluoromethylheptyl 4-(6′-n-decyloxy-2′-naphthoyloxy)benzoate (compound exemplified by the formula [B-14]).

FIG. 6 shows the $^1$H-NMR spectrum chart of 1''-trifluormethylheptyl 4-(6'-n-decyloxy-2'-naphthoxyloxy)-benzoate represented by the following formula (B-14).

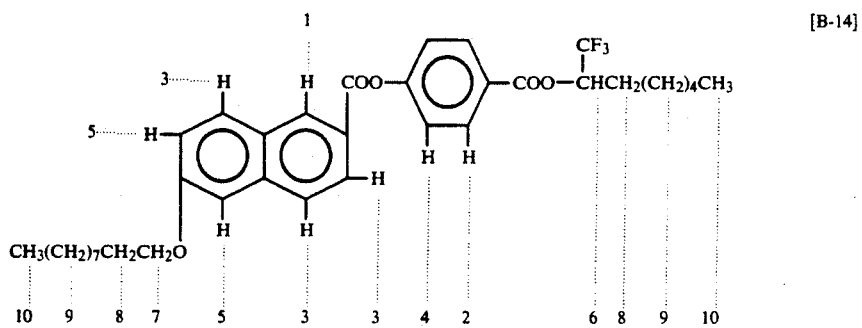

[B-14]

In the formula [B-14], the serial numbers 1 to 10 each indicate either one or either ones of the hydrogen atoms of the ester, and each of the numbers corresponds to the same number attached to either one of the peaks shown in FIG. 6.

Of the liquid crystal racemic mixtures represented by the formula [I-B], those represented by the following formulas [B-2], [B-6] and [B-14] exhibit particularly excellent liquid crystal properties.

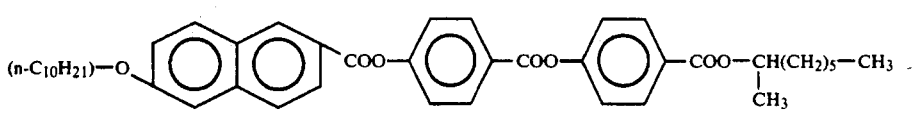

[B-2]

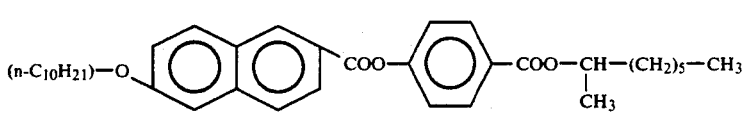

[B-6]

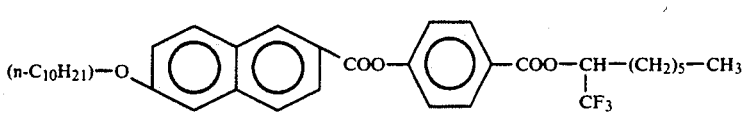

[B-14]

Table 2 shows phase transition temperatures of the three compounds which are represented by the formulas [B-2], [B-6] and [B-14], respectively and which exhibit particularly excellent properties as liquid crystals among the liquid crystal racemic mixtures of the invention represented by the formula [I-B].

TABLE 2

| Compound | Phase transition temp. | |
|---|---|---|
| | Cry-SmA or Iso | SmA-Iso |
| [B-2] | 72° C. | 179° C. |
| [B-6] | 59° C. | |

TABLE 2-continued

| Compound | Phase transition temp. | |
|---|---|---|
| | Cry-SmA or Iso | SmA-Iso |
| [B-14] | 52° C. | 61° C. |

Figure 7:
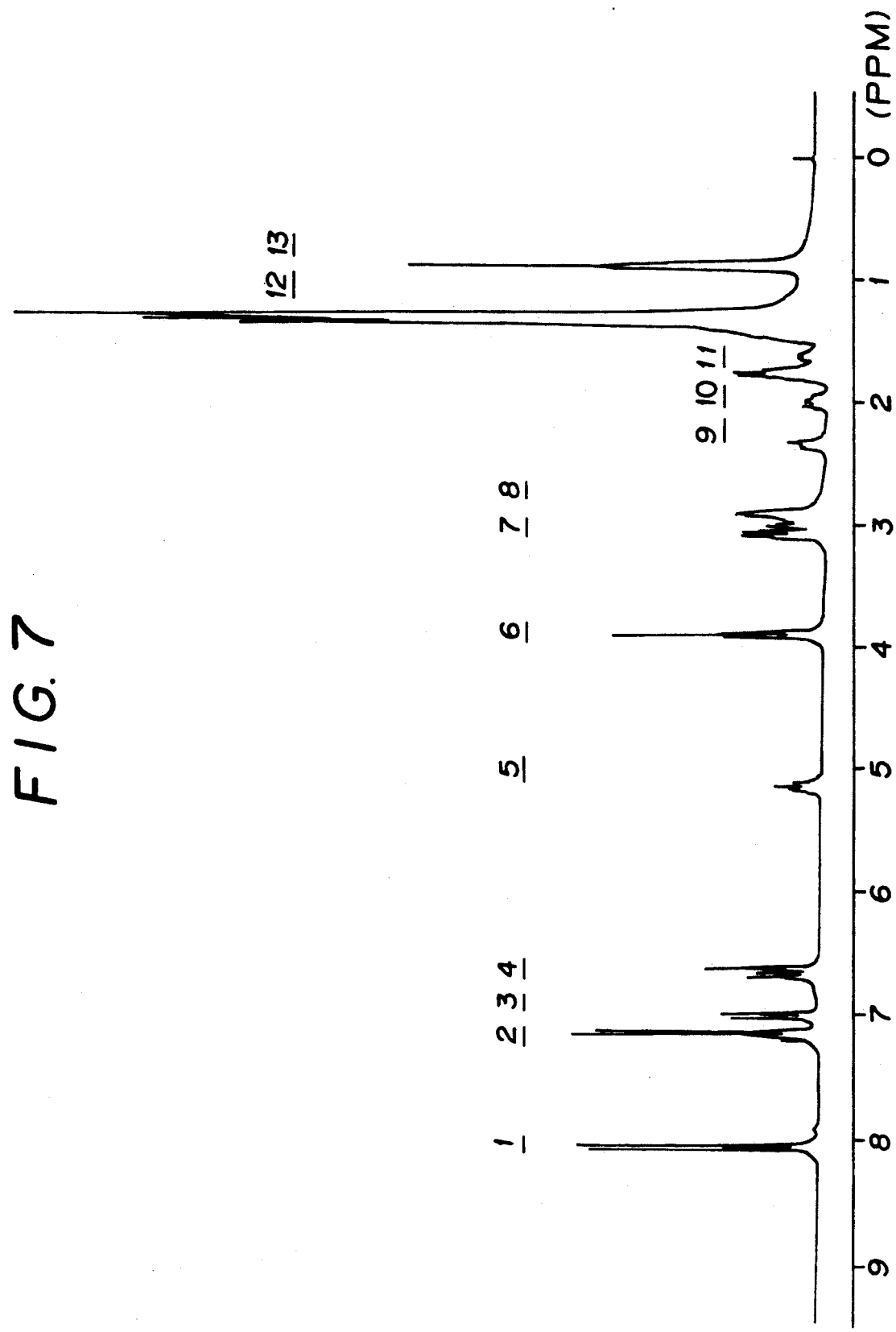
FIG. 7 is a chart showing the ¹H-NMR spectrum 4″-(1‴-methylheptyloxycarbonyl)phenyl of trans-4-(4′-decyloxyphenyl)cyclohexanecarboxylate (compound exemplified by the formula [C-6]).

FIG. 7 shows the ¹H-NMR spectrum chart of 4″-(1″″-methylheptyloxycarbonyl)phenyl trans-4-(4′-decyloxyphenyl)cyclohexanecarboxylate which is represented by the following formula [C-6] and which is among the liquid crystal racemic mixtures represented by the formula [I-C].

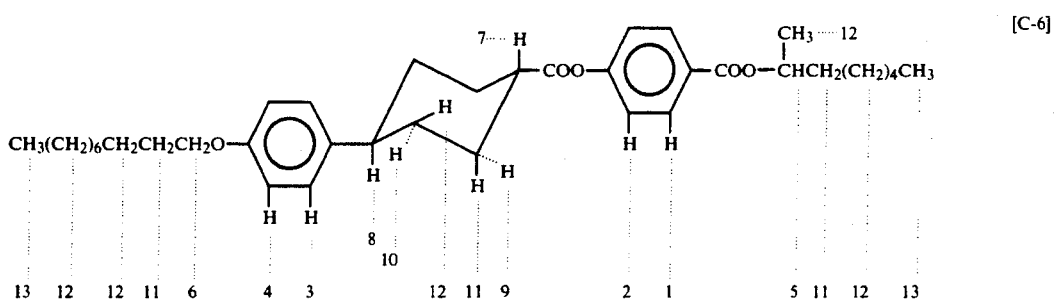

[C-6]

In the formula [C-6], the serial numbers 1 to 13 each indicate either one or either ones of the hydrogen atoms of the ester, and each of the numbers corresponding to the same number attached to either one of the peaks shown in FIG. 7.

Figure 8:
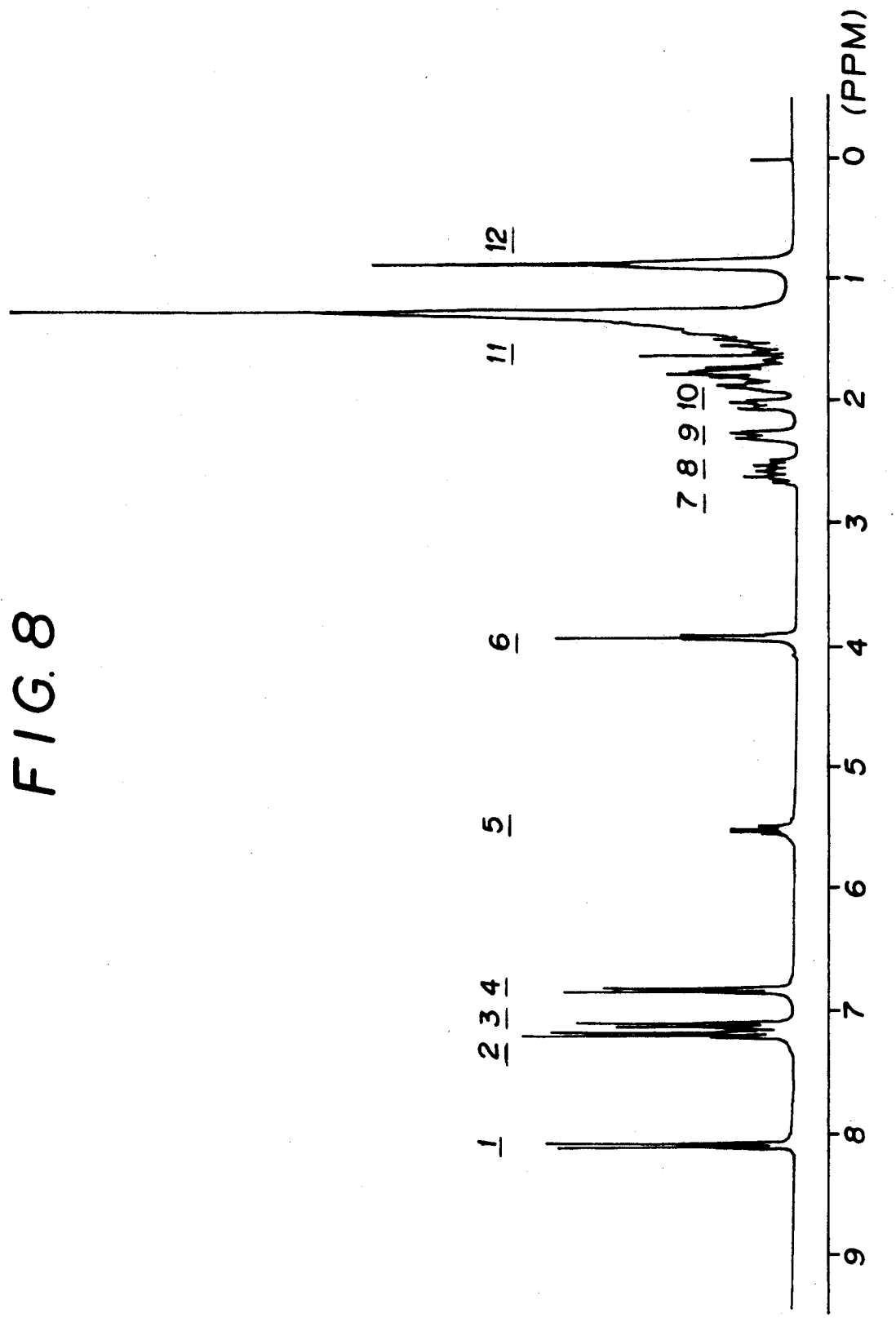
FIG. 8 is a chart showing the ¹H-NMR spectrum of 4″-(1‴-trifluoromethylheptyloxycarbonyl)phenyl trans-4-(4′-decyloxyphenyl)cyclohexanecarboxylate (compound exemplified by the formula [C-6]).

FIG. 8 shows the ¹H-NMR spectrum chart of 4″-(1‴-trifluoromethylheptyloxycarbonyl)phenyl trans-4-(4′-decyloxyphenyl)cyclohexanecarboxylate represented by the following formula [C-14].

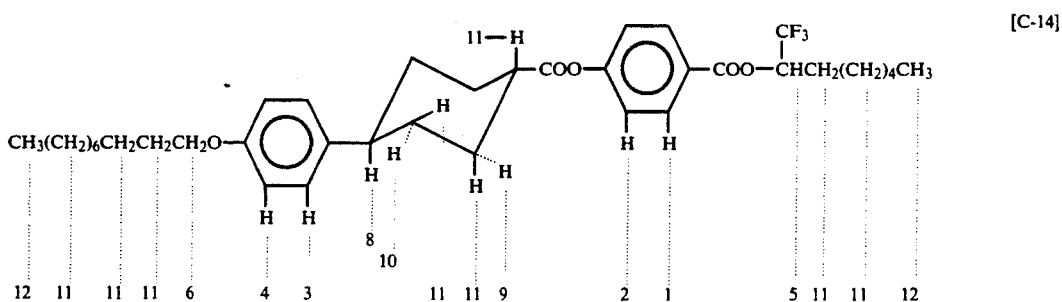

In the formula [C-14], the serial numbers 1 to 13 each indicate either one or either ones of the hydrogen atoms of the ester, and each of the numbers corresponds to the same number attached to either one of the peaks shown in FIG. 8.

Of the liquid crystal racemic mixtures represented by the formula [I-C], the compounds represented by the following formulas [C-6] or [C-14] exhibit particularly excellent liquid crystal properties.

compounds exhibit liquid crystal properties when mixed with another material.

Accordingly, when the carboxylic acid ester of the invention is used as a liquid crystal compound, the liquid crystal racemic mixture of the invention may be used singly or it may be mixed with another liquid crystal compound and used. For example, the liquid crystal compound of the invention, namely, the carboxylic acid ester, may be used either as a main ingredient of a smec-

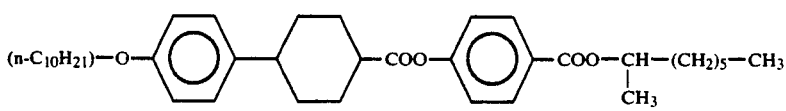

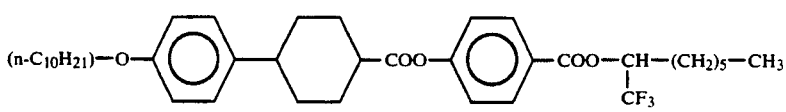

Table 3 shows the transition temperatures of the compounds which are represented by the formulas [C-6] or [C-14] and which exhibit particularly excellent properties as liquid crystals among the liquid crystal racemic mixtures represented by the formula [I-C].

TABLE 3

| Compound | Phase transition temp. | |
|---|---|---|
| | Cry-SmA or Iso | SmA-Iso |
| [C-6] | −46° C. | 21° C. |
| [C-14] | 31° C. | 44° C. |

Among the liquid crystal racemic mixtures represented by the formulas [I-A] to [I-C], there are compounds showing themselves liquid crystal properties as illustrated in Table 1 to Table 3, and there are also tic liquid crystal composition, or as an assistant of a liquid crystal composition containing as a main ingredient another liquid crystal compound which is to become in a smectic phase or a chiral smectic phase. Furthermore, the liquid crystal compound of the invention may also be incorporated with a compound which is to become in a chiral smectic phase as a main ingredient or an assistant to obtain a liquid crystal composition which is to become in a chiral smectic phase.

Examples of the liquid crystal compounds which can be used with the liquid crystal racemic mixtures of the invention represented by the formula [I] include (+)-4'-(2''-methylbutyloxy)phenyl-6-octyloxynaphthalene-2-carboxylate, 4'-decyloxyphenyl-6-((+)-2''-methylbutyloxy)naphthalene-2-carboxylate, liquid crystal compounds such as

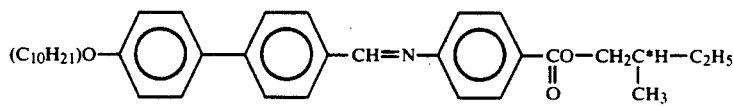

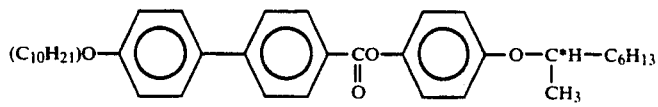

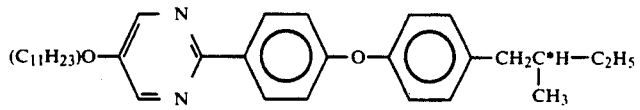

such compounds each having a cyclic structure and an optical activity as

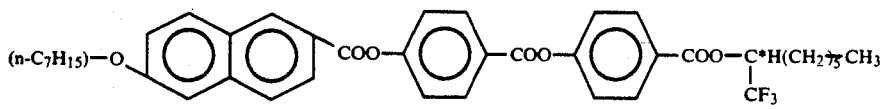

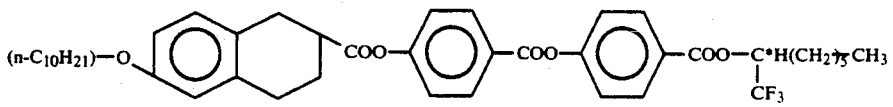

and

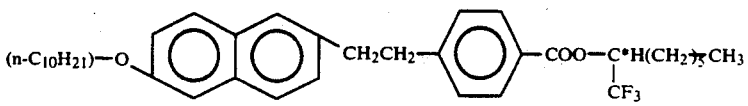

such liquid crystal compounds each having an asymmetric carbon atom and an optical activity as

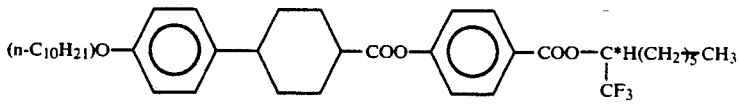

Examples of the liquid crystal compounds may also include

Schiff base liquid crystal compounds such as

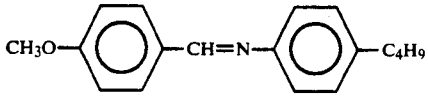

and

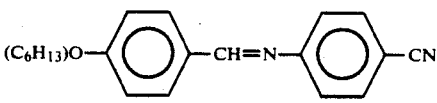

azoxy liquid crystal compounds such as

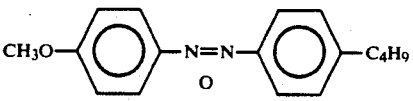

benzoic acid ester liquid crystal compounds such as

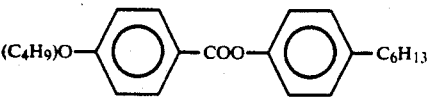

and

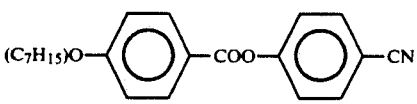

cyclohexylcarboxylic acid ester liquid crystal compounds such as

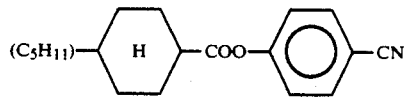

and

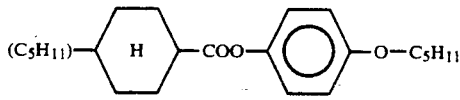

phenyl liquid crystal compounds such as

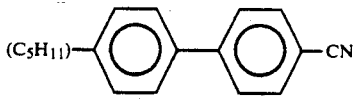

terphenol liquid crystal compounds such as

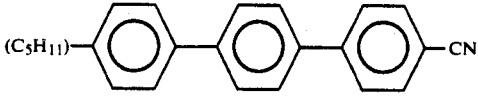

cyclohexyl liquid crystal compounds such as

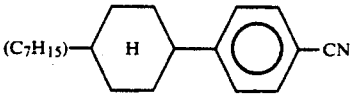

and

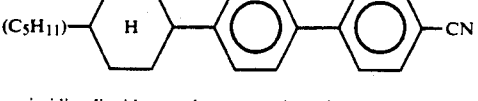

pyrimidine liquid crystal compounds such as

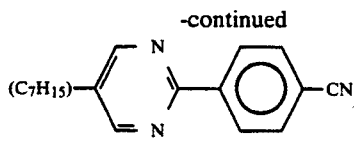

The liquid crystal racemic mixtures as described above usually show an optical switching phenomenon when a voltage is applied. Accordingly, display devices having a good response can be prepared by utilizing this phenomenon. In the present invention, liquid crystal elements in which this phenomenon is utilized or methods for driving the elements utilizing this phenomenon can be referred to, for example, JP L-O-P Nos. 107216/1981 and 118744/1984.

Although there can be used compounds capable of becoming in a smectic C phase, a smectic F phase, a smectic G phase, a smectic H phase, a smectic I phase, a smectic J phase and a smectic K phase as liquid crystal materials employed in such display devices, display devices in which such liquid crystal compounds other than those in a smectic C phase are incorporated generally show a slow (low) response speed. Driving liquid crystal elements into which a liquid crystal compound in a smectic C phase is incorporated has therefore been considered effective from the practical standpoint.

The liquid crystal material used in the present invention can be used not only in a smectic C phase but also in a smectic A phase by utilizing such a method for driving a display device into which a liquid crystal material in a smectic A phase is incorporated as having already been proposed by the present inventors in JP Appln. No. 157808/87. That is to say, utilization of the driving method makes it possible to drive in a wide range liquid crystal elements in which a liquid crystal material containing the liquid crystal racemic mixture as described above is incorporated, and to significantly increase the electrooptical response rate of the elements.

Table 4 shows examples of liquid crystal materials which show low phase transition temperatures due to the incorporation of the liquid crystal racemic mixtures as described above. Concretely, there are listed phase transition temperatures of liquid crystal materials containing 1″-methylheptyl 4-(1′,2′,3′,4′-tetrahydro-6′-decyloxy-2′-naphthoyloxybenzoate represented by the formula [A-6] or 1″-trifluoromethylheptyl 4-(1′,2′,3′,4′-tetrahydro-6′-decyloxy-2′-naphthoyloxybenzoate represented by the formula [A-14].

The liquid crystal compound used with the compound of the formula [A-6] or compound of the formula [A-14] has the structure as described below.

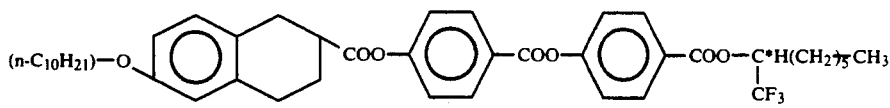

[Cr-1]

TABLE 4

| Liquid crystal material | Phase transition temp. | | |
|---|---|---|---|
| | Cry-SmA or SmC$_A$* | SmC$_A$*-SmA | SmA-Iso |
| [A-6] | −49° C. | | 7° C. |
| [A-6] + [Cr-1] (34%:66%) | <−30° C. | | 73° C. |
| [A-14] | 38° C. | | |
| [A-14] + [Cr-1] (37%:63%) | −4° C. | 30° C. | 77° C. |
| [B-6] | 59° C. | | 93° C. |

TABLE 4-continued

| Liquid crystal material | Phase transition temp. | | |
|---|---|---|---|
| | Cry-SmA or SmC$_A$* | SmC$_A$*-SmA | SmA-Iso |
| [B-6] + [Cr-1] (34%:66%) | <−30° C. | | 61° C. |
| [B-14] | 52° C. | | |
| [B-14] + [Cr-1] (38%:62%) | 58° C. | 83° C. | 86° C. |
| [C-6] | −46° C. | | 21° C. |
| [C-6] + [Cr-1] (34%:66%) | <−30° C. | | 77° C. |
| [C-14] | 31° C. | | 44° C. |
| [C-14] + [Cr-1] (37%:63%) | <−30° C. | 64° C. | 82° C. |
| [Cr-1] | 44° C. | 79° C. | 94° C. |

Note: The percentage values of the compositions denote percent by weight.

As is clear from Table 4, when the liquid crystal compound of the formula [Cr-1] is mixed with, for example, the compound exemplified by the formula [A-6] or [A-14], the resultant liquid crystal racemic mixtures exhibit a temperature of a phase transition from a chiral smectic phase to an isotropic phase of 73° C. or 77° C. (namely, exhibiting lowering of the phase transition temperature 94° C. of the compound of [Cr-1]), respectively. Even when such carboxylic acid esters are used in combination, the resultant mixture exhibit maintenance of the temperature of the phase transition (Cry-SmA or Cry-SmCA*) of the compound represented by [Cr-1].

Though the proportion of the liquid crystal racemic mixture represented by the formula [I] and another liquid crystal compound in the liquid crystal material of the liquid crystal element in the invention can be freely determined while the properties, etc. of the resultant liquid crystal material (composition) is taken into consideration, the above-mentioned racemic mixture is used in an amount of usually 1 to 99 parts by weight, preferably 5 to 75 parts by weight, based on 100 parts by weight of the liquid crystal compound of the liquid crystal material.

Additionally, for example, when a display element is prepared with a liquid crystal compound as described above, there may be incorporated such additives which can be incorporated into conventional liquid crystal compositions as an electroconductive material and a life-extending agent in addition to the above-mentioned racemic mixture and other liquid crystal compounds.

The liquid crystal material used in the invention is manufactured with such a racemic mixture as described above, and if desired another liquid crystal compound and other additives which are mixed together.

Figure 9:
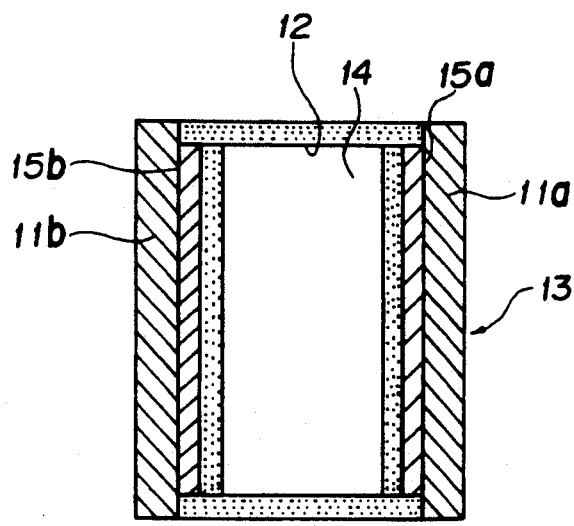
FIG. 9 is a sectional view schematically showing one embodiment of a liquid crystal element of the present invention.

The liquid crystal element of the invention comprises a cell filled with the liquid crystal material and polarizing plates. That is to say, the liquid crystal element of the invention comprises, as shown in FIG. 9 as an example, a cell 13 composed of two transparent substrate 11a, 11b so arranged as to form a gap 14 therebetween to be filled with a liquid crystal material and two transparent electrodes 15a, 15b each formed on each of the surfaces to face the liquid crystal material 12 of the two transparent substrates 11a, 11b, the liquid crystal material 12 filled in the gap 14 of the cell 13, and two polarizing plates (not shown in FIG. 9) arranged on each outer side of of the cell 13.

In the present invention, glass plates or transparent polymer plates can be mentioned as examples of transparent substrates.

In the case of using a glass substrate, an under coat (i.e., a layer for preventing permeation of unnecessary components) containing silicon oxide, etc. as the major component may be formed on the glass substrate surface to prevent deterioration of the liquid crystal material caused by elution of the alkali component of the substrate.

The transparent substrate has a thickness of usually 0.01 to 1.0 mm when it is a glass substrate.

In the invention, flexible transparent substrates can also be employed as the transparent substrates. In this case, at least one of the transparent substrates may be a flexible one or both of them may be flexible ones.

Polymer films, etc. can be used as the flexible transparent substrates.

In the present invention, it is preferable that the thickness t (mm) and elastic modulus E (kdf/m²) of a transparent substrate, and a gap width a (mm) formed in a cell, have the following relationship when flexible transparent substrates are used:

$$a^4/Et^3 < 0.32.$$

A transparent electrode is formed on the surface of the transparent substrate.

The transparent electrode can be formed by coating the transparent substrate surface with, for example, iridium oxide or tin oxide. The transparent electrode can be formed by conventionally known methods.

The transparent electrode has a thickness of usually 100 to 2000 Å.

The transparent substrate on which such a transparent electrode as described above is formed may further have an orientation control layer or a ferrolectric layer on the transparent electrode. Examples of the orientation control layer includes an organic film and an inorganic film formed by chemical adsorption of an organosilane coupling agent or a carboxylic acid multinuclear complex. Examples of the organic film include films of polymers such as polyethylene, polypropylene, polyester, nylon, polyvinyl alcohol (Poval, trade name) and polyimide. The organic films as described above can be formed by coating, bonding, vapor deposition, polymerization (e.g., plasma polymerization) on the substrate, etc.

Examples of the inorganic film include films of oxides such as silicon oxide, germanium oxide and alumina, films of nitrides such as silicon nitride, and other semiconductor films. The inorganic films as described above can be formed by vapor deposition (e.g., declined vapor deposition), sputtering, etc.

Examples of imparting orientation properties to the films as described above include imparting anisotropy or a shape anomaly to the films during the formation of the films, and imparting orientation properties from outside after forming the thin films. Concrete examples of imparting orientation properties include coating a transparent electrode with a polymer material such as polyimide to form a film and rubbing the film in one direction, stretching a polymer film and depositing an oxide by declined vapor deposition.

Such films as described above, for example, orientation layers, may be formed in such a manner that the layers may also play the role of a spacer.

Two of the transparent substrates each having a transparent electrodes as described above are arranged in such a manner that the two transparent electrodes face each other and form a gap therebetween to be filled with a liquid crystal material.

The width of the gap thus formed is usually 1 to 10 μm, preferably 1 to 5 μm. Such a gap as mentioned above can be easily formed, for example, by arranging the two substrates in such a manner that they hold a spacer therebetween.

As the spacer, there can be employed, for example, a polyimide type polymer material obtained by patterning a photosensitive polyimide precursor. By virtue of using such a spacer as mentioned above, a monodomain is formed by interfacial effect between the spacer and the liquid crystal material.

Figure 10:
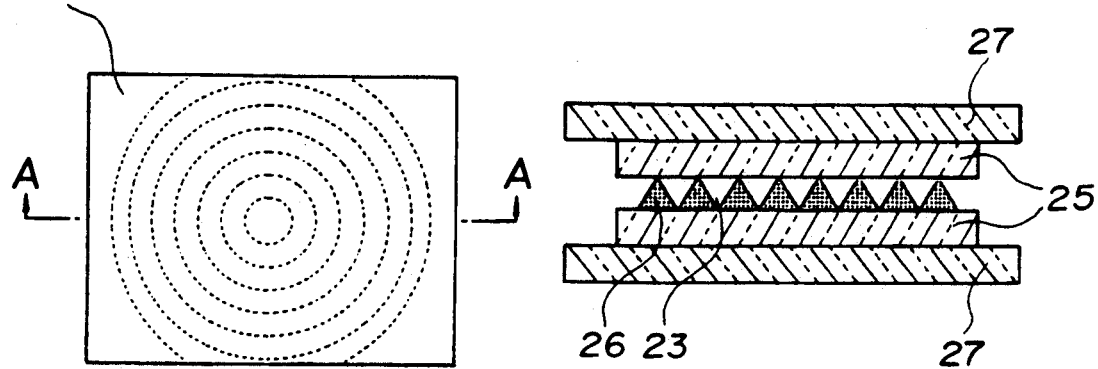
FIG. 10a is a plan view of a liquid crystal element in which a concentric spacer is used.
FIG. 10b is a sectional view of the liquid crystal element 10a taken along the line A—A in the plan view.

As shown in FIG. 10(a) (plan view of a liquid crystal element) and FIG. 10(b) (sectional view of the liquid crystal element obtained along the A—A line in the plan view), an orientation film and a spacer can be integrated into one system, for example, by using a concentric spacer 26 which also acts as an orientation film. Transparent substrates 27, transparent electrodes 25 and a liquid crystal material 23 are also shown in FIG. 10(a) and/or (b).

Figure 11A:
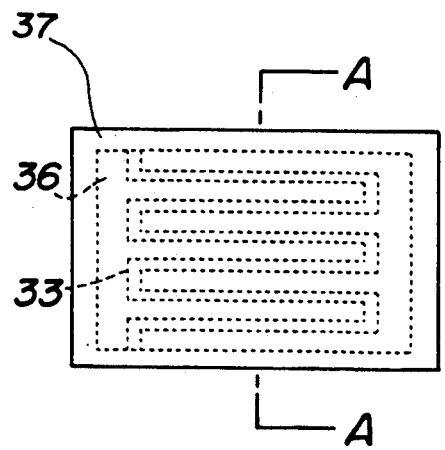
FIG. 11a is a plan view of a liquid crystal element in which a comb spacer is used.
Figure 11B:
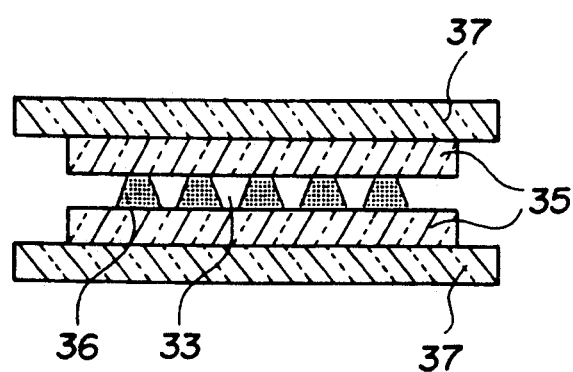
FIG. 11b is a sectional view of the liquid crystal element of FIG. 11a taken along the line A—A in the plan view.

As shown in FIG. 11(a) (plan view of a liquid crystal element) and FIG. 11(b) (sectional view of the liquid crystal element obtained along the A—A line in the plan view), an orientation film and a spacer can be integrated into one system, for example, by using a comblike spacer 36 which also acts as an orientation film. Transparent substrates 37, transparent electrodes 35 and a liquid crystal material 33 are also shown in FIG. 11 (a) and/or (b).

Figure 12:
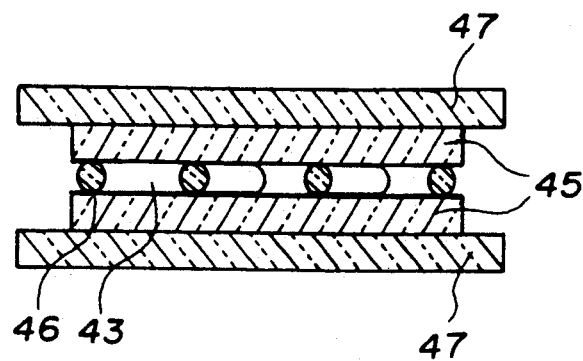
FIG. 12 is a diagram schematically showing one embodiment of a liquid crystal element formed by using fibers as a spacer.

As shown in FIG. 12, fibers 46 are placed in a liquid crystal material 43, and used as a spacer which is different from the above-mentioned spacer. By the use of the fibers 46, the transparent substrates 47 each having a transparent electrode 45 can be held to form a gap having a constant thickness.

Fibers whose average diameter (d) and average length (L) satisfy the following relationship are preferably used in the invention:

$$3 \leq L/d \leq 100.$$

Though various kinds of fibers can be used as a spacer in the invention, those formed by spinning alkali glass are preferable.

Furthermore, granular particles may also be used in place of or together with the above-mentioned fibers.

The particles as referred to above include those composed of melamine resin, urea resin or benzoguanamine resin and having a particle size of 1 to 10 μm.

The two transparent substrates so arranged as to form a gap therebetween in the manner described above are then generally sealed along their peripheries to be bonded.

Examples of the sealing materials include epoxy resin and silicone resin, and they may be modified with acrylic rubber, silicone rubber, etc.

A liquid crystal material containing the aforementioned liquid crystal racemic mixture represented by the formula [I] is filled in the gap of the liquid crystal cell having the above-mentioned structure.

The liquid crystal material as described above filled in the gap of the liquid crystal cell can be oriented, for example, by temperature gradient method in which a spacer edge is used or monoaxial orientation control method such as a surface treatment with an orientation film. In the present invention, moreover, the initial orientation of the liquid crystal material can also be conducted by applying an electric field formed as the result of applying a direct current bias voltage to the liquid crystal material while the crystal material is heated.

Figure 13:
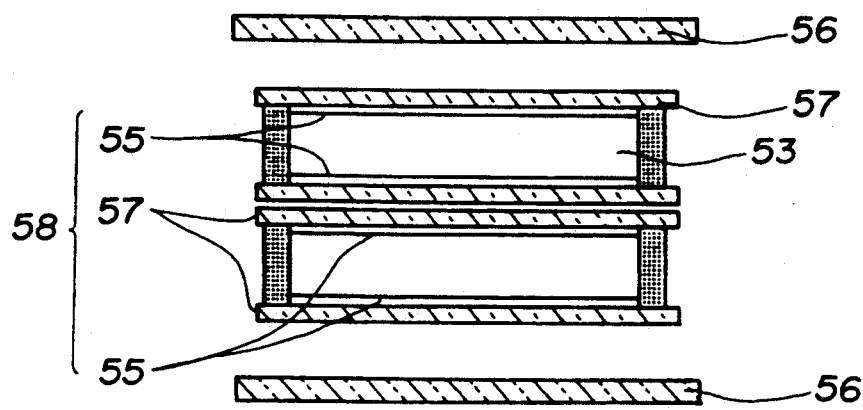
FIG. 13 is a diagram schematically showing one embodiment of a liquid crystal element having two cells arranged between polarizing plates.

The liquid crystal cell filled with the liquid crystal material and initially oriented as described above is placed between two polarizing plates. As shown in FIG. 13, two or more of such cells 58 each comprising two transparent substrates 57, transparent electrodes 55 and a liquid crystal material 53 as described above may also be placed between the two polarizing plates 56.

In the liquid crystal element of the invention, the two polarizing plates are arranged in such a manner that the two polarizing planes of the polarizing plates make an angle of 70°–110°. Preferably, these two polarizing plates are so arranged that the polarizing directions of the two polarizing plates meet at right angles, that is, the above-mentioned angle becomes 90°.

Examples of such a polarizing plate include resin films such as polyvinyl alcohol films and polyvinyl butyral films to which polarizing properties are imparted by stretching these films in the presence of iodine, etc. to allow these films to absorb iodine. These polarizing films may also be coated with another resin etc. to form a multi-layered structure.

In the present invention, the liquid crystal cell as described above can be placed between the two polarizing plates arranged as described above in such a manner that the cell forms an angle (rotation angle) within the range of ±10° from the state wherein the transmitted light is minimized in its amount (i.e. the darkest state), preferably the cell produces the darkest state. Alternatively, the liquid crystal cell as described above can be placed between the two polarizing plates arranged as described above in such a manner that the cell forms an angle (rotation angle) within the range of ±10° from the state wherein the transmitted light is maximized in its amount (i.e. the brightest state), preferably the cell produces the brightest state.

A liquid crystal material 12 is filled in the gap 14 of the cell 13 having a structure as described above.

A liquid crystal racemic mixture represented by the formula [I] or a liquid crystal composition containing the racemic mixture is used as the liquid crystal material 12 filled in the gap.

As shown in FIG. 9, the liquid crystal element of the invention can be manufactured by filling the gap 14 of the cell 13 with the liquid crystal material 12 as described above, and initially orienting the liquid crystal material 12.

The liquid crystal material 12 is usually heated until it becomes in a molten state, and filled (poured) into the gap 14 of the cell 13 kept at a reduced pressure while being molten. After filling the liquid crystal material, the filling inlet for the liquid crystal material formed in the cell 13 is sealed.

Subsequently, the cell 13 whose inlet for the liquid crystal material is sealed is heated until the liquid crystal material 12 filled in the cell has a temperature not lower than the temperature where it begins to show an isotropic phase, and cooled to a temperature where the liquid crystal material 12 shows a liquid crystal phase.

In the present invention, the temperature is dropped during cooling at a rate of preferably not greater than 2° C./min, more preferably 0.1 to 2.0° C./min, and particularly preferably 0.1°–0.5° C./min. As the result of cooling the cell 13 at such a rate as mentioned above, the initial orientation condition of the liquid crystal material 12 is improved, and a liquid crystal element having a liquid crystal phase having a decreased amount of orientation defects and composed of a monodomain can be easily formed. The term "initial orientation" designates an arranged state of a liquid crystal material before changing the orientation vector of the liquid crystal material by applying an electric voltage, etc. to the liquid crystal element.

The liquid crystal elements of the invention thus formed are significantly excellent in properties such as contrast compared with conventional liquid crystal elements, and can be appropriately used as surface stabilized ferroelectric liquid crystal elements, helically modulated elements, overly scattered elements, guest-host elements, vertically oriented liquid crystal elements, etc.

The liquid crystal element of the invention can be driven, for example, by applying thereto an electric field controlled to have a frequency of usually 1 Hz to 100 kHz, preferably 10 Hz to 10 kHz, an electric field of usually 0.01 to 60 Vp-p/$\mu m'$ (voltage per $\mu m$), preferably 0.05 to 30 Vp-p/$\mu m'$.

When there is used a liquid crystal material having an optical activity which is prepared by mixing a liquid crystal racemic mixture represented by the formula [I] with a liquid crystal compound (e.g. a compound represented by the formula [Cr-1]) showing a chiral smectic phase, the amount of light that transmits the liquid crystal element of the invention comes to exhibit two kinds of hysteresis curves by changing a waveform (driving wave) of the electric field applied for driving the liquid crystal element. That is to say, there are two driving methods. One is a driving method utilizing the so-called bistability state, and the other is one utilizing the so-called tristability state.

When the liquid crystal element of the invention is prepared by so arranging a liquid crystal cell (as described above) filled with an optically active liquid crystal material between two polarizing plates whose polarizing planes meet at right angles that the element attains the darkest state without application of an electric field, the liquid crystal element can be driven, for example, by applying a rectangular wave (or pulse wave), a triangular wave, a sinusoidal wave or a waveform in combination of these waves at a frequency of 50 Hz to 100 kHz, preferably 70 Hz to 10 kHz.

For example, when a rectangular wave (or pulse wave or both in combination) is applied to the liquid crystal element, the rate for driving the liquid crystal element can be increased by making the width of the electric field not greater than 10 msec, preferably 0.01 to 10 msec. In this region, the liquid crystal element of the invention may be used as a bistable one. Further, the liquid crystal element of the invention can be used as a tristable one in the region where it is not required to be driven at high rate by making the width of the electric field greater than 10 msec, preferably 33 to 1000 msec. The width of the electric field signifies, for example, in rectangular waves, the length (namely, period) of the electric field maintained at a predetermined voltage.

Various liquid crystal display devices and electrooptical display devices can be manufactured by employing the liquid crystal elements of the invention. Moreover, of the liquid crystal elements of the invention, those filled with a liquid crystal material capable of becoming in a smectic phase can be used in manufacturing storage type liquid crystal display devices such as thermal write type liquid crystal display devices and laser write type liquid crystal display elements, or electrooptical display devices. Furthermore, optical switching elements such as optical shutters or liquid crystal printers, and liquid crystal display devices or electrooptical display devices such as piezoelectric elements and pyroelectric elements can be manufactured by employing liquid crystal materials containing a compound having antiferroelectricity.

That is to say, the liquid crystal element of the invention exhibit, for example, a tristable state when a compound having antiferroelectricity is used together, and accordingly it may be allowed to have an optical switching function or a display function by reversing the electric field so that it attains tristability.

In the switching elements of the invention incorporating the racemic mixture represented by the formula [I], switching operations can be performed by only altering the orientation direction of the molecule. The first term of the electric field applied to the switching elements of the invention acts on driving the elements, and therefore the elements may be driven at a low voltage.

The switching elements realize a high speed response of not longer than several tens of microseconds, and as a result significantly shorten the operation time thereof. Accordingly, display devices (liquid crystal display devices) having a large screen with many scanning lines can be easily manufactured by incorporating the liquid crystal elements of the invention. The display devices can be driven at room temperature or at a temperature not higher than room temperature, and therefore the devices can be driven without auxiliary means for controlling the driving temperature.

Furthermore, in the liquid crystal materials used in the invention, the molecules in the materials are inducibly oriented when an electric field is applied even in a smectic A phase where the molecules are generally considered not to exhibit tristability. Optical switching can be conducted by utilizing this property. That is, the display devices of the invention may be driven even in a smectic A phase, a phase which has not usually been utilized because a practical response speed has not been attained when conventional liquid crystal materials are used, by utilizing the driving methods and devices having already been proposed in JP Application No. 157808/1987. Moreover, the liquid crystal materials used in the invention show not less than two stable states even in a smectic F phase, etc. which has higher order than a smectic C phase, and therefore optical switching can be conducted by utilizing not less than two stable states of these phases in a manner similar to that mentioned above.

Though the display devices incorporating the liquid crystal elements of the invention can be driven by various methods, concrete examples of the driving methods are described below.

A first method is a method in which a liquid crystal element of the invention is placed between two polarizing plates, and an external voltage is applied to the liquid crystal element. As a result, the orientation vector of the liquid crystal material is changed, and the orientation vector change produces birefringence of the liquid crystal material. Display is carried out by utilizing polarization of the two polarizing plates and the birefringence.

A second method is a method in which a liquid crystal material containing a dichroic dyestuff is used, and which utilizes the dichroism of the dyestuff. Display is achieved in this method by changing the orientation direction of the liquid crystal compound to change the absorption wavelength of light of the material. The dyestuff used herein is usually a dichroic dyestuff, and examples of the dichroic dyestuff include azo dyes, naphthoquinone dyes, cyanine dyes and anthraquinone dyes.

The display devices manufactured by using the liquid crystal elements of the invention can be driven by electric address display system such as static driving, simple matrix driving and composite matrix driving, optical address display system, thermal address display system and optical beam display system.

Figure 14:
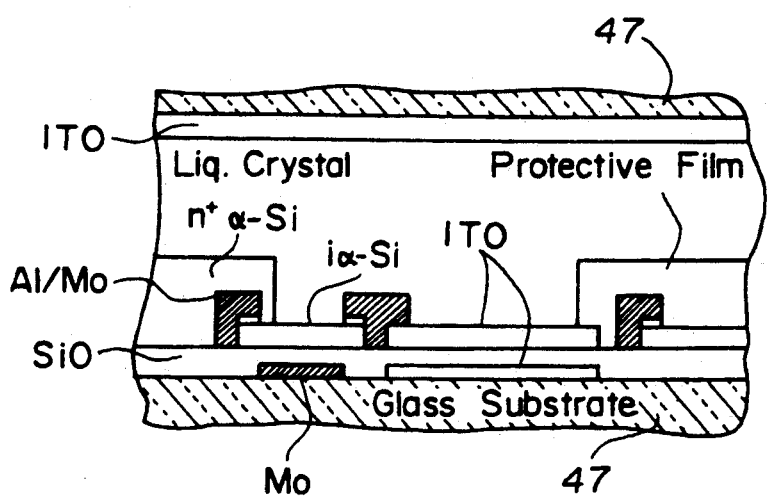
FIG. 14a is a sectional view of an embodiment of the invention showing two terminal nonlinear elements arranged on a transparent substrate.
FIG. 14b is a diagram schematically showing an optical display device on one substrate on which a nonlinear element or an active element is arranged.
Figure 14:
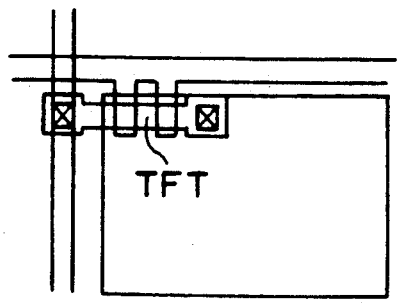

Furthermore, when the display devices of the invention are field driven, nonlinear elements or active elements can be used as elements for driving each pixel. More concretely, examples of two-terminal nonlinear elements include an element having a varistor, a MIM (Metal Insulator Metal), a diode, etc. arranged on one of the transparent substrates and utilizing nonlinearity of these parts, as shown in FIG. 14 (a). Examples of three-terminal active elements include an element in which a TFT (film transistor), a Si-MOS (Si-metal oxide semiconductor field-effect transistor) and a SOS (Silicon on Sapphire) arranged to pixels, as shown in FIG. 14 (b).

EFFECT OF THE INVENTION

The present invention provides a novel liquid crystal racemic mixture and a novel liquid crystal composition containing the racemic mixture. The liquid crystal composition containing the liquid crystal racemic mixture shows excellent liquid crystal characteristics due to a specific cyclic structure of the racemic mixture.

The liquid crystal element of the invention using the liquid crystal composition shows an especially high contrast and in addition a broad operation temperature range, consumes decreased power, operates in a smectic phase at a temperature not higher than room temperature, for example, not higher than the ice point, and functions at a high switching speed.

Furthermore, liquid crystal elements are manufactured by a process as described above in the present invention, and therefore liquid crystal elements having an especially excellent contrast as described above can be easily manufactured.

The scanning time of liquid crystal display devices or electrooptical display devices can be markedly shortened when such elements are incorporated into these display devices, and these devices well function even when used at a temperature not higher than room temperature.

The devices as described above consume decreased power, show a stabilized contrast, and can be driven at a low voltage. The bistability in a smectic phase of a liquid crystal racemic mixture is utilized in such devices, and therefore the devices can be particularly favorably employed as optical switching elements driven at a temperature not higher than room temperature.

The present invention is illustrated below with reference to examples, but it should be construed that the invention is in no way limited to these examples.

EXAMPLE 1

Synthesis of 1″-methylheptyl 4-(1′,2′,3′,4,6′-tetrahydro-6′-n-decyloxy-2′-naphthoyloxy)benzoate (compound exemplified by the formula [A-6])

First Step

To a mixture of 3.86 g (11.8 mmoles) of 6-n-decyloxynaphthalene-2-carboxylic acid and 130 ml of 1,2-diethoxyethane was added 3.0 g (130 mg atoms) of metallic sodium in a nitrogen atmosphere at 120° C. with stirring, and the resultant mixture was further heated to the reflux temperature.

To the mixture was added dropwise 10 g (114 mmoles) of isoamyl alcohol over a period of 1 hour, and the resultant mixture was allowed to react under reflux for additional 11 hours. The mixture was cooled to room temperature, and the remaining metallic sodium was treated with ethanol. The reaction mixture was acidified by adding 20% hydrochloric acid.

After adding 100 ml of water to the reaction mixture, the organic phase was separated and washed with water.

The organic phase was concentrated under a reduced pressure to obtain 4.25 g of a solid. The solid was recrystallized with toluene to obtain 2.95 g of 1,2,3,4-tetrahydro-6-n-decyloxynaphthalene-2-carboxylic acid.

Second Step

To a mixture of 0.33 g (1 mmole) of 1,2,3,4-tetrahydro-6-n-decyloxy-2-naphthalene-2-carboxylic acid obtained in the first step, 0.21 g (1 mmole) of 1′-methylheptyl 4-hydroxybenzoate, 0.012 g (0.1 mmole) of 4-N,N-dimethylaminopyridine and 10 ml of methylene chloride was added dropwise 2 ml of a methylene chloride solution of 0.21 g (1 mmole) of N,N′-dicylohexylcarbodiimide at room temperature with stirring over a period of 1 hour, and the resultant mixture was allowed to react at room temperature for 8 hours.

The reaction mixture was filtered, and the filtrate was concentrated.

A colorless semisolid in an amount of 0.53 g was separated from the condensate by column chromatography.

The M/e value of FD-mass spectrum on the semisolid was 562.

FIG. 1 shows the $^1$H-NMR spectrum chart of this compound.

From the results of the analyses, the compound was identified to be 1″-methylheptyl 4-(1′,2′,3′,4′-tetrahydro-6′-n-decyloxy-2′-naphthoyloxy)benzoate (compound exemplified by the formula [A-6] which was the aimed compound.

EXAMPLE 2

Synthesis of 1″-trifluoromethylheptyl 4-(1′,2′,3′,4′-tetrahydro-6′-n-decyloxy-2′-naphthoyloxy)benzoate (compound exemplified by the formula [A-14])

Second Step

To a mixture of 0.33 g (1 mmole) of 1,2,3,4-tetrahydro-6-n-decyloxynaphthalene-2-carboxylic acid obtained in the first step in Example 1, 0.30 g (1 mmole) of 1′-methyltrifluoroheptyl 4-hydroxybenzoate, 0.012 g (0.1 mmole) of 4-N,N-dimethylaminopyridine and 10 ml of methylene chloride was added dropwise 2 ml of a methylene chloride solution containing 0.21 g (1 mmole) of N,N′-dicyclohexylcarbodiimide at room temperature with stirring over a period of 1 hour.

The mixture was further allowed to react at room temperature for 8 hours.

The reaction mixture was filtered, and the filtrate was concentrated.

A colorless semisolid in an amount of 0.58 g of was separated from the concentration by column chromatography.

The M/e value of FD-mass spectrum on the semisolid was 618.

FIG. 2 shows the $^1$H-NMR spectrum chart of this compound.

From the results of the analyses, the compound was identified to be 1″-trifluoromethylheptyl 4-(1′,2′,3′,4′-tetrahdyro-6′-n-decyloxy-2′-naphthoyloxy)benzoate (compound exemplified by the formula [A-14]) which was the aimed compound.

EXAMPLE 3

Synthesis of 1‴-methylheptyl 4-[4′-(1″,2″,3″,4″-tetrahydro-6″-n-decyloxy-2″-naphthoyloxy)benzoyloxy]-benzoate (compound exemplified by the formula [A-2])

First Step

To a mixture of 3.86 g (11.8 mmoles) of 6-n-decyloxynaphthalene-2-carboxylic acid and 130 ml of 1,2-diethoxyethane was added 3.0 g (130 mg atoms) of metallic sodium in a nitrogen atmosphere at 120° C. with stirring, and the resultant mixture was further heated to the reflux temperature.

To the mixture was added 10 g (114 mmoles) of isoamyl alcohol over a period of 1 hour, and the resultant mixture was further allowed to react under reflux for 11 hours. The mixture was cooled to room temperature, and the remaining metallic sodium was treated with ethanol. The reaction mixture was acidified by adding 20% hydrochloric acid.

After adding 100 ml of water to the reaction mixture, the organic phase was separated and washed with water.

The organic phase was concentrated under a reduced pressure to obtain 4.25 g of a solid. The solid was recrystallized with toluene to obtain 2.95 g of 1,2,3,4-tetrahydro-6-n-decyloxynaphthalene-2-carboxylic acid.

Second Step

To a mixture of 1.66 g (5 mmoles) of 1,2,3,4-tetrahydro-6-n-decyloxy-2-naphthalene-2-carboxylic acid obtained in the first step, 1.14 g (5 mmoles) of 1′-methylheptyl 4-hydroxybenzoate, 0.12 g (1 mmole) of 4-N,N-dimethylaminopyridine and 20 ml of methylene chloride was added dropwise 2 ml of a methylene chloride solution containing 1.03 g (5 mmoles) of N,N′-dicyclohexylcarbodiimide at room temperature with stirring over a period of 1 hour, and the resultant mixture was further allowed to react at room temperature for 10 hours.

The reaction mixture was filtered, and the resultant filtrate was concentrated. Benzyl 4-(1′,2′,3′,4′-tetrahydro-6′-n-decyloxy-2′-naphthoyloxy)benzoate, a white solid, in an amount of 2.32 g (4.23 mmoles) was separated from the condensate by column chromatography.

Third Step

Hydrogen was blown for 8 hours into a mixture of 2.17 g (4 mmoles) of benzyl 4-tetrahydro-6′-n-decyloxy-2′-naphthoyloxy)benzoate obtained in the second step, 1 g of palladium/carbon and 30 ml of tetrahydrofuran at room temperature and normal pressure with stirring.

The reaction mixture was filtered with celite, a filter aid, and the filtrate was further concentrated to obtain as a white solid 1.59 g (3.52 mmoles) of 4-(1',2',3',4'-tetrahydro-6'-n-decyloxy-2'-naphthoyloxy)benzoic acid.

To a mixture of 0.45 g (1 mmole) of 4-(1',2',3',4'-tetrahydro-6'-n-decyloxy-2'-naphthoyloxy)benzoic acid obtained in the third step, 0.21 g (1 mmole) of 1'-methylheptyl 4-hydroxybenzoate, 0.012 g (0.1 mmole) of 4-N,N-dimethylaminopyridine and 10 ml of methylene chloride was added dropwise 2 ml of a methylene chloride solution containing 0.21 g (1 mmole) of N,N'-dicyclohexanecarbodiimide at room temperature with stirring over a period of 1 hour.

The mixture was further allowed to react at room temperature for 8 hours.

The reaction solution was filtered, and the filtrate was concentrated. A colorless semisolid in an amount of 0.48 g was separated from the concentrate by column chromatography.

The M/e value (molecular ion peak) of FD-mass spectrum semisolid was 684.

FIG. 3 shows the $^1$H-NMR spectrum chart of the compound.

From the analyses, the compound was identified to be 1'''-methylheptyl 4-[4'-(1',2',3',4''-tetrahydro-6''-n-decyloxy-2''-naphthoyloxy)benzoyloxy]benzoate (compound exemplified by the formula [A-2]) which was the aimed compound.

EXAMPLE 4

The phase transition temperatures of the following compounds were determined: the compound exemplified by the formula [A-6] and obtained in Example 1, the compound exemplified by the formula [A-14] and obtained in Example 2, and the compound exemplified by the formula [A-2] and obtained in Example 3.

The results are shown in Table 5.

TABLE 5

| Compound | Phase transition temperature | |
|---|---|---|
| | Cry-SmA | SmA-Iso |
| [A-2] | 61° C. | 117° C. |
| [A-6] | −49° C. | 7° C. |
| [A-14] | 38° C. | |

In Table 5 to Table 10, Cry, SmA and Iso denote a crystal phase, a smectic A phase and isotropic liquid, respectively.

As is clear from the results shown in Table 5, the compounds of the formulas [A-2], [A-6] and [A-14] show a liquid crystal phase in a wide temperature range and at temperature not higher than room temperature.

A liquid crystal material (liquid crystal composition) was prepared by mixing the carboxylic acid esters represented by the formulas [A-6] and [A-14], and a compound represented by the following formula [Cr-1] in proportions by weight as listed in Table 4.

The phase transition temperatures of the compositions were determined.

The results are shown in Table 6.

Further, the phase transition temperature of the compound represented by the above formula [Cr-1] is also listed in Table 6.

TABLE 6

| Compound or Composition | Phase transition temperature | | |
|---|---|---|---|
| | Cry-SmA or Cry-SmC* (°C.) | SmC*-SmA (°C.) | SmA-Iso (°C.) |
| [A-6] | −49 | | 7 |
| [A-6] + [Cr-1] 34%:66% | <−30 | | 73 |
| [A-14] | 38 | | |
| [A-14] + [Cr-1] 37%:63% | −4 | 30 | 77 |
| [Cr-1] | 44 | 79 | 94 |

Note: The percentage values of the compositions denote percent by weight.

EXAMPLE 5

A liquid crystal material composed of the carboxylic acid ester represented by the formula [A-14] and the compound represented by the formula [Cr-1] (ester/compound weight ratio of 37:63) was melted by heating, and introduced into the gap kept at a reduced pressure of a cell which was composed of two substrates, two ITO transparent electrodes each formed on one of the substrates and two orientation control films each 150 Å thick and formed on one of the ITO transparent electrodes, as shown in FIG. 9, said orientation control films being made of polyimide (PIQ-5400, a product of Hitachi Kasei Kogyo K.K.), and rubbed in such a manner that they have orientation almost parallel to each other and in the same direction.

After filling the liquid crystal material as described above, the cell was heated to 100° C., held at 100° C. for 5 minutes, and cooled to 20° C. at a rate of 1° C./min to obtain a liquid crystal element.

The thus obtained liquid crystal element showed an orientation contrast of 29 and a switching time of 429 μsec. The cell condition is as follows:

(a) External size: 2.5 cm long ×2.2 cm wide ×1.5 cm thick (b) Substrate: 0.7 mm thick, composed of glass (c) Distance between substrates: 2 μm (d) Sidewall size: 1.8 mm long ×2.2 cm wide ×1.5 μm thick The above-mentioned cell was prepared in the following manner.

A glass substrate having an ITO transparent electrode film thereon was coated with polyimide. That is to say, the ITO transparent electrode film was coated with polyimide (PIQ-5400, a product of Hitachi Kasei Kogyo K.K.) by spin coating.

In detail, the polyimide was diluted with N-methylpyrrolidone to obtain a 1.2% solution, and the solution was used for spin coating at 2000 rpm. The resultant coating was cured by heating at 325° C. for 30 minutes to form a polyimide film 150 to 200 Å thick. The polyimide film was then rubbed with a nylon cloth in one direction, thereby imparting a liquid crystal-orienting ability thereto.

Two of the polyimide film-coated glass substrates prepared as described above were stacked to form a cell. That is, an epoxy adhesive was applied onto one of the polyimide film-coated glass substrates by means of silk screen printing in order to bond the two substrates together and to control the gap of the cell. The epoxy adhesive was prepared by mixing an adhesive base (LCB-304B, a product of EHC) with a curing agent (LCB-304B, a product of EHC) and beads (GP-20, a product of EHC) for controlling the cell gap in the proportion by weight of 130:30:3.

The two substrates were stacked in such a manner that the polyimide films of the substrates faced each other. The epoxy adhesive coating was cured by stepwise heating at 50° C. for 15 minutes, 60° C. for 15 minutes, 70° C. for 15 minutes, 80° C. for 15 minutes, 125° C. for 15 minutes and 170° C. for 60 minutes to bond the substrates together.

The thus prepared cell having a gap of about 2 μm was filled with the liquid crystal composition prepared as described above, and the properties of the resultant cell were evaluated.

Figure 15:
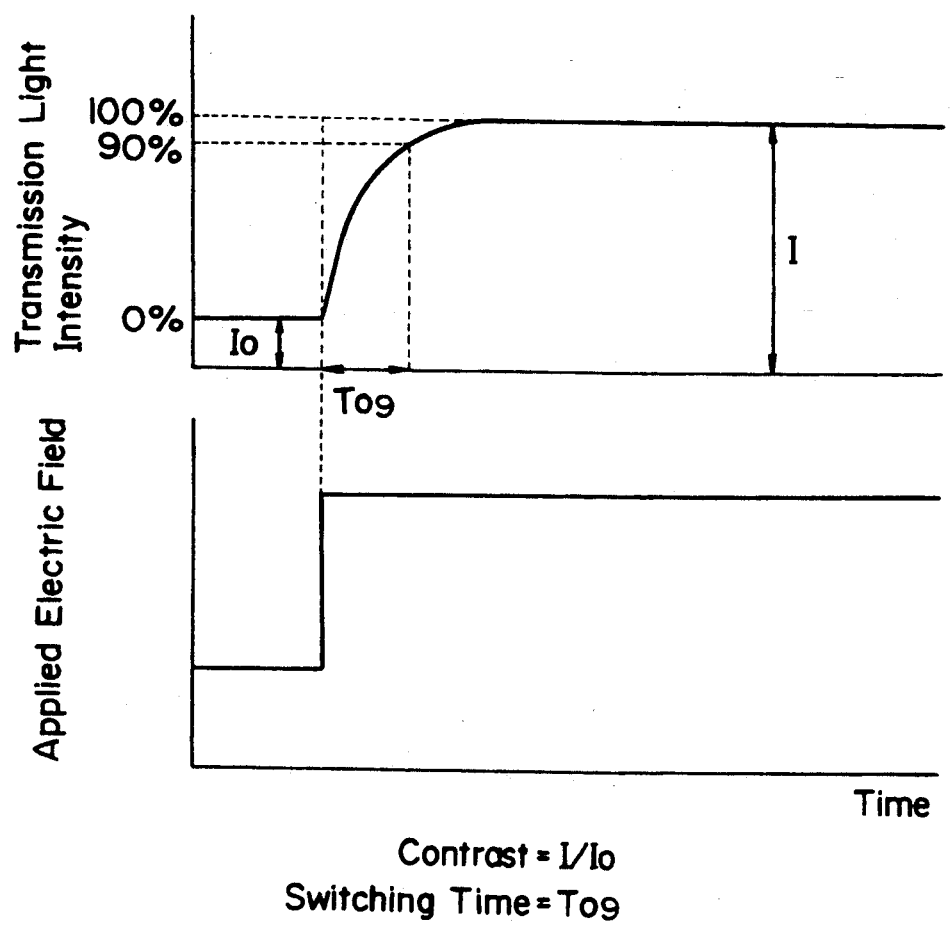
FIG. 15 is a graph conceptually showing conditions for determining the switching time and contrast of a liquid crystal element.

In addition, the switching time and contrast were determined by the follwing procedure. As shown in FIG. 15, a liquid crystal element was prepared by placing the cell between two polarizing plates whose polarizing planes met at right angles, in such a manner that the orientation direction of the polyimide film made an angle of 22.5 degrees with the polarizing direction. A rectangular wave of ±30 mV/m was applied to the cell at a frequency of 100 Hz, and the intensity I of the transmitted light was measured. The contrast was obtained from the I (bright state)/I (dark state) ratio, and the switching time was defined as the time necessary for the change of I from 0% to 90%.

Comparative Example 1

Example 5 was repeated except that the compound of the formula [Cr-1] was singly used to obtain a liquid crystal element.

The thus obtained liquid crystal element showed a switching time of 767 μsec and a contrast of 25.

It is clear from the comparison of Example 5 and Comparative Example 1 that the switching time of a liquid crystal element prepared by incorporating a carboxylic acid ester represented by the formula [I] is markedly shortened.

EXAMPLE 6

Example 5 was repeated except that the cooling rate was changed to 0.1° C./min to obtain a liquid crystal element.

The liquid crystal element showed an orientation contrast of 54.

EXAMPLE 7

Example 5 was repeated except that the cooling rate was changed to 10° C./min to obtain a liquid crystal element.

The liquid crystal element showed an orientation contrast of 9, and tended to somewhat lower the contrast as the result of high cooling rate.

EXAMPLE 8

Synthesis of 1″-methylheptyl 4-[4′-(6″-n-decyloxy-2″-naphthoyloxy)benzoyloxy]benzoate

First Step

To a mixture of 1.64 g (5 mmoles) of 6-n-decyloxynaphthalene-2-carboxylic acid, 1.14 g (5 mmoles) of benzyl 4-hydroxybenzoate, 0.12 g (1 mmole) of 4-N,N-dimethylaminopyridine and 20 ml of methylene chloride was added dropwise 10 ml of a methylene chloride solution containing 1.03 g (5 mmoles) of N,N′-dicyclohexylcarbodiimide at room temperature with stirring over a period of 1 hour.

The resultant mixture was further allowed to react at room temperature for 10 hours.

The reaction mixture was filtered, and the filtrate was concentrated. Benzyl 4-(6′-n-decyloxy-2′-naphthoyloxy)benzoate, a white solid, in an amount of 2.31 g (4.28 mmoles) was separated from the condensate by column chromatography.

Second Step

Hydrogen was blowin for 8 hours into a mixture of 2.16 g (4 mmoles) of benzyl 4-naphthoyloxy)benzoate obtained in the first step, 1 g of 5% palladium/carbon and 30 ml of tetrahydrofuran with stirring at room temperature and normal pressure.

The reaction mixture was filtered with celite, a filter aid, and the filtrate was concentrated to obtain 1.59 g (3.53 mmoles) of 4-(6′-n-decyloxy-2′-naphthoyloxy)benzoic acid.

Third Step

To a mixture of 0.45 g (1 mmole) of 4-(6′-n-decyloxy-2′-naphthoyloxy)benzoic acid, 0.21 g (1 mmole) of 1′-methylheptyl 4-hydroxybenzoate, 0.012 g (0.1 mmole) of 4-N,N′-dimethylaminopyridine and 10 ml of methylene chloride was added dropwiseat 2ml of a methylene chloride solution containing 0.21 g (1 mmole) of N,N′-dicyclohexylcarbodiimide at room temperature with stirring over a period of 1 hour.

The mixture was further allowed to react at room temperature for 8 hours.

A colorless semisolid in an amount of 0.48 g was separated from the concentrate by column chromatography.

The M/e value of FD-mass spectrum on the semisolid was 680.

FIG. 4 shows the $^1$H-NMR spectrum chart of the compound.

From the results of the analyses, the compound was identified to be 1‴-methylheptyl 4-[4′-(6″-n-decyloxy-2″-naphthoyloxy)benzoyloxy]benzoate (compound exempified by the formula [B-2]) which was the aimed compound.

EXAMPLE 9

Synthesis of 1″-methylheptyl 4-(6′-n-decyloxy-2′-naphthoyloxy)benzoate

To a mixture of 0.33 g (1 mmole) of 6-n-decyloxy-2′-naphthalene-2-benzoic acid, 0.21 g (1 mmole) of 1′-methylheptyl 4-hydroxybenzoate, 0.012 g (0.1 mmole) of 4-N,N-dimethylaminopyridine and 10 ml of methylene chloride was added dropwise 2 ml of a methylene chloride solution containing 0.21 g (1 mmole) of N,N′-dicyclohexylcarbodiimide at room temperature with stirring over a period of 1 hour.

The mixture was further allowed to react at room temperature for 8 hours.

A colorless semisolid in an amount of 0.52 g was separated from the concentrate by column chromatography.

The M/e value (molecular ion peak) of FD-mass spectrum on the semisolid was 558.

FIG. 5 shows the $^1$H-NMR chart of the compound.

From the results of the analyses, the compound was identified to be 1″-methylheptyl 4-(6′-n-decyloxy-2′-naphthoyloxy)benzoate (compound exemplified by the formula [B-6]) which was the aimed compound.

EXAMPLE 10

Synthesis of 1″-trifluormethylheptyl 4-(6′-n-decyloxy-2′-naphthoyloxy)benzoate

To a mixture of 0.33 g (1 mmole) of 6-n-decyloxy-2′-naphthalene-2-benzoic acid, 0.30 g (1 mmole) of 4-hydroxybenzoic acid-1′-trifluoromethylheptyl ester, 0.012 g (0.1 mmole) of 4-N,N-dimethylaminopyridine and 10 ml of methylene chloride was added dropwise 2 ml of a methylene chloride solution containing 0.21 g of N,N′-dicyclohexylcarbodiimide at room temperature with stirring over a period of 1 hour.

The resultant mixture was further allowed to react at room temperature for 8 hours.

A colorless viscous liquid in an amount of 0.58 g was separated from the concentrate by column chromatography.

The M/e value (molecular ion peak) of FD-mass spectrum on the semisolid was 614.

FIG. 6 shows the $^1$H-NMR of spectrum chart of the compound.

From the results of the analyses, the compound was identified to be 1″-trifluoromethylheptyl 4-(6′-n-decyloxy-2′-naphthoyloxy)benzoate (compound exemplified by the formula [B-14]) which was the aimed compound.

EXAMPLE 11

The phase transition temperature of the compound exemplified by the formula [B-2] and obtained in Example 1 the compound exemplified by the formula [B-6] and obtained in Example 2 and the compound exemplidied by the formula [B-14] and obtained in Example 3 were determined. The results are shown Table 7.

TABLE 7

| Compound | Phase transition temperature | |
|---|---|---|
|  | Cry-SmA | SmA-Iso |
| [B-2] | 72° C. | 179° C. |
| [B-6] | 59° C. |  |
| [B-14] | 52° C. | 61° C. |

It is clear from the results shown in Table 7 that the compound of the formula [B0-2], the compound of the formula [B-6] and the compound of the formula [B-14] show a liquid crystal phase in a wide temperature range.

Liquid crystal compositions were then prepared by mixing the thus obtained compounds of the formulas [B-6 and [B-14], and the compound of the formula [Cr-1] in the proportions by weight listed in Table 4.

The phase transition temperatures of the compositions were determined.

The results are shown in Table 8. Furthermore, the phase transition temperature of the compound represented by the formula [Cr-1π is also listed in Table 8.

TABLE 8

| Compound or Composition | Phase transition temperature | | |
|---|---|---|---|
|  | Cry-SmA or Cry-SmC* (°C.) | SmC*-SmA (°C.) | SmA-Iso (°C.) |
| [B-6] | 59 |  |  |
| [B-6] + [Cr-1] 34%:66% | <−30 |  | 93 |
| [B-14] | 52 |  | 61 |
| [B-14] + [Cr-1] 38%:62% | 58 | 83 | 86 |
| [Cr-1] | 44 | 79 | 94 |

Note: The percentage values of the compositions denote percent by weight.

EXAMPLE 12

A liquid crystal material composed of the carboxylic acid ester represented by the formula [B-6] and the compound represented by the formula [Cr-1] (ester/compound weight ratio of 37:63) was melted by heating, and introduced into the gap kept at a reduced pressure of a cell which was composed of two substrates, two ITO transparent electrodes each formed on one of the substrates and two orientation control films each 150 Å thick and formed on one of the ITO transparent electrodes, as shown in FIG. 9, said orientation control films being made of polyimide (PIQ-5400, a product of Hitachi Kasei Kogyo K.K.), and rubbed in such a manner that they have orientation almost pararell to each other and in the same direction.

After filling the liquid crystal material as described above, the cell was heated to 100° C., held at 100° C. for 5 minutes, and cooled to 20° C. at a rate of 1° C./min to obtain a liquid crystal element.

The thus obtained liquid crystal element showed a switching time of 53 μsec and a contrast of 3.

The above-mentioned cell was prepared in Example 5.

Comparative Example 2

Example 12 was repeated except that the compound of the formula [Cr-1] was used as a liquid crystal material.

The thus obtained liquid crystal element showed a switching time of 767 μsec and a contrast of 25.

It is clear from the comparison of Example 12 and Comparative Example 2 that the switching time of a liquid crystal element is markedly shortened by incorporating a carboxylic acid ester represented by the formula [I] thereinto.

EXAMPLE 13

Synthesis of 4″-(1′″-methylheptyloxycarbonyl)phenyl trans-4-(4′-decyloxyphenyl)cyclohexanecarboxylate

First Step

To a mixture of 2.84 g (7.9 mmoles) of trans-4-(4′-decyloxyphenyl)cyclohexanecarboxylate acid, 1.80 g (7.9 mmoles) of benzyl 4-hydroxybenzoate, 0.012 g (0.1 mmole) of 4-N,N-dimethylaminopyridine and 30 ml of methylene chloride was added dropwise 15 ml of a methylene chloride solution containing 1.63 g (7.9 mmoles) of N,N′-dicyclohexylcarbodiimide with stirring over a period of 1 hour while the mixture was ice cooled.

The resultant mixture was further allowed to react at room temperature for 10 hours.

The reaction mixture was filtered, and the filtrate was concentrated. 4''-Benzyloxycarbonylphenyl trans-4-(4'-decyloxyphenyl)cyclohexanecarboxylate, a white solid, was obtained from the concentrate by column chromatography in an amount of 3.60 g (6.3 mmoles, yield of 80 mol%).

Second Step

Hydrogen was blown for 10 hours into a mixture of 2.85 g (5 mmoles) of 4''-benzyloxycarbonylphenyl trans-4-(4'-decyloxyphenyl)cyclohexanecarboxylate, 0.29 g of 5% palladium/carbon and 20 ml of tetrahydrofuran at room temperature with stirring.

The 5% palladium/carbon was filtered out, and the filtrate was concentrated. The concentrate was recrystallized with acetone to obtain 2.28 g (4.75 mmoles, yield of 95 mol%) of 4''-carboxyphenyl trans-4-(4'-decyloxyphenyl)cyclohexanecarboxylate as a white solid.

Third Step

To 20 ml of methylene chloride were suspended 0.480 g (1 mmole) of 4''-carboxyphenyl trans-4-(4'-decyloxyphenyl)cyclohexanecarboxylate obtained in the above-described second step, 0.130 g (1 mmole) of 1-methylheptanol and 0.012 g (0.1 mmole) of 4-N,N-dimethylaminopyridine, and 2 ml of a methylene chloride solution containing 0.206 g of (1 mmole) of N,N'-cyclohexylcarbodiimide was added over a period of 30 minutes to the resultant suspension while the suspension was ice cooled.

The mixture was further allowed to react at room temperature for 16 hours.

After the reaction, the reaction product obtained by filtering was concentrated. A solid having a melting point of 52°–53° C. was separated from the concentrate by column chromatography in an amount of 0.312 g.

The M/e value of FD-mass spctrum on the compound was 592.

FIG. 7 shows the $^1$H-NMR spectrum chart of the compound.

From the results of the analyses, the compound was identified to be 4''-(1'''-methylheptyloxycarbonyl)phenyl trans-4-(4'-decyloxyphenyl)cyclohexanecarboxylate which is represented by the formula [C-6] and which was the aimed compound.

EXAMPLE 14

Synthesis of 4''-(1'''-trifluoromethylheptyloxycarbonyl)phenyl trans-4-(4'-decyloxyphenyl)cyclohexanecarboxylate To 20 ml of methylene chloride were suspended 0.480 g (1 mmole) of 4''-carboxyphenyl trans-4-(4'-decyloxyphenyl)cyclohexanecarboxylate obtained in the second step of Example 1, 0.130 g (1 mmole) of 1-trifluoromethylheptanol and 0.012 g (0.1 mole) of 4-N,N-dimethylaminpyridine, and 2 ml of a methylene chloride solution containing 0.206 g (1 mmole) of N,N'-cyclohexylcarbodiimide was added dropwise to the suspension over a period of 30 minutes while the suspension was ice cooled.

The resultant reaction mixture was further allowed to react for 16 hours.

After the reaction, the reaction mixture was filtered, and the reaction product was concentrated. A solid having a melting point of 21° C. was separated in an amount of 0.35 g from the concentrate by column chromatography.

The M/e value of FD-mass spectrum on the compound was 646.

FIG. 8 shows the $^1$H-NMR spectrum chart of the compound.

From the results of the analyses, the compound was identified to be 4''-(1'''-trifluoromethylheptyloxycarbonyl)phenyl trans-4-(4'-decyloxyphenyl)cyclohexanecarboxylate which is represented by the formula [C-14] and which was the aimed compound.

EXAMPLE 15

The phase transition temperatures of the compound exemplified by the formula [C-6] and obtained in Example 1 and the compound exemplified by the formula [C-14] and obtained in example 2 were determined.

The results are shown in Table 9.

TABLE 9

| Compound | Phase transition temperature | |
|---|---|---|
|  | Cry-SmA | SmA-Iso |
| [C-6] | −46° C. | 21° C. |
| [C-14] | 31° C. | 44° C. |

It is clear from the results shown in Table 9 that the compound of the formula [C-6] and the compound of the formula [C-14] show a liquid crystal phase in a wide temperature range at a temperature not higher than room temperature.

A liquid crystal material (liquid crystal composition) was prepared by mixing the carboxylic acid esters of the formulas [C-6] and [C-14], and the compound of the formula [Cr-1] in the proportions by weight listed in Table 4 to obtain liquid crystal materials (liquid crystal compositions).

The phase transition temperatures of these compositions were determined.

The results are shown in Table 10. The phase transition temperature of the compound of the formula [Cr-1] is also listed in Table 10.

TABLE 10

| Compound or Composition | Phase transition temperature | | |
|---|---|---|---|
|  | Cry-SmA or Cry-SmC* (°C.) | SmC*-SmA (°C.) | SmA-Iso (°C.) |
| [C-6] | −46 |  | 21 |
| [C-6] + [Cr-1] 34%:66% | <−30 |  | 77 |
| [C-14] | 31 |  | 44 |
| [C-14] + [Cr-1] 37%:63% | <−30 | 64 | 82 |
| [Cr-1] | 44 | 79 | 94 |

Note: The percentage values of the compositions denote percent by weight.

EXAMPLE 16

A liquid crystal material composed of the carboxylic acid ester represented by the formula [C-14] and the compound represented by the formula [Cr-1] (ester/compound weight ratio of 37:63) was melted by heating, and introduced into the gap kept at a reduced pressure of a cell which was composed of two substrates, two ITO transparent electrodes each formed on one of the substrates and two orientation control films each 150 Å thick and formed on one of the ITO transparent electrodes, as shown in FIG. 9, said orientation control films being made of polyimide (PIQ-5400, a product of Hitachi Kasei Kogyo K.K.), and rubbed in such a manner that they have orientation almost parallel to each other and in the same direction.

After filling the liquid crystal material as described above, the cell was heated to 100° C., held at 100° C. for 5 minutes, and cooled to 40° C. at a rate of 1° C./min to obtain a liquid crystal element.

The thus obtained liquid crystal element showed a switching time of 104 μsec and a contrast of 19.

The above-mentioned cell was manufactured in Example 5.

Comparative Example 3

Example 16 was repeated except that the compound of the formula [Cr-1] was singly used as a liquid crystal material to obtain a liquid crystal element.

The thus obtained liquid crystal element showed a switching time of 119 μsec and a contrast of 29 at 40° C.

It is clear from the comparison of Example 5 and Comparative Example 1 that the liquid crystal element prepared with a carboxylic acid ester represented by the formula [I] shows a markedly shortened switching time.

What is claimed is:

1. A liquid crystal racemic mixtures represented by the following formula [I]:

  [I]

wherein R¹ is a group selected from the group consisting of a branched alkyl group of 4-20 carbon atoms, a branched alkoxy group of 4-20 carbon atoms and a halogenated alkyl group, which may be branched, of 3-20 carbon atoms, X and Y are each independently a group selected from the group consisting of —COO—, —OCO—, —CH₂CH₂—, —CH₂O—, —OCH₂—, —COCH₂—, —CH₂CO— and —S—S—, or a single bond, A and B are each independently a group selected from the group consisting of

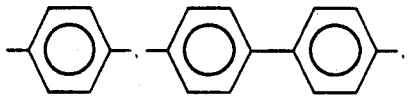

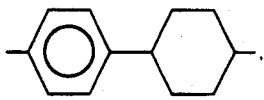

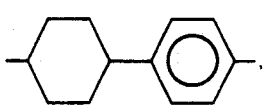

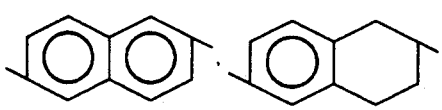

Z is a group selected from the group consisting of

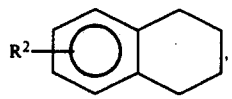

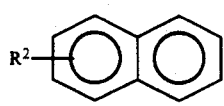 and 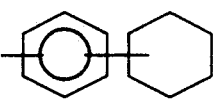

(wherein R² is each independently a group selected from the group consisting of an alkyl group of 3-20 carbon atoms, an alkoxy group of 3-20 carbon atoms and a halogenated alkyl group of 3-20 carbon atoms), and m and n are each independently an integer of 0-2, with the proviso that both m and n do not become simultaneously 0.

2. The liquid crystal racemic mixture as claimed in claim 1, wherein R¹ in the formula [I] is a group selected from the group consisting of

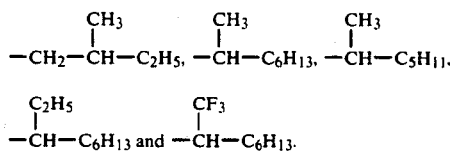

3. The liquid crystal racemic mixture as claimed in claim 1 or claim 2, wherein R2 in the formula [I] is an alkoxy group, X is —COO—, A is 1,4-phenylene group, m is an integer of 1 or 2 and n is 0.

4. A liquid crystal composition comprising a liquid crystal racemic mixture represented by the following formula [I]:

  [I]

wherein R¹ is a group selected from the group consisting of a branched alkyl group of 4-20 carbon atoms, a branched alkoxy group of 4-20 carbon atoms and a halogenated alkyl group, which may be branched, of 3-20 carbon atoms, X and Y are each independently a group selected from the group consisting of —COO—, —OCO—, —CH₂CH₂—, —CH₂O—, —OCH₂—, —COCH₂—, —CH₂CO— and —S—S—, or a single bond, A and B are each independently a group selected from the group consisting of

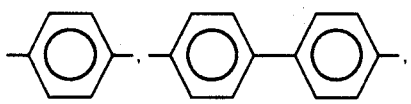

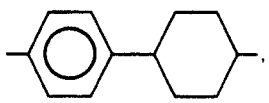

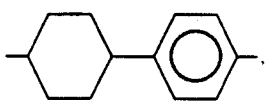

-continued

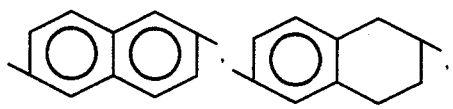

Z is a group selected from the group consisting of

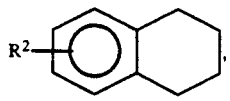

(wherein R² is each independently a group selected from the group consisting of an alkyl group of 3-20 carbon atoms, an alkoxy group of 3-20 carbon atoms and a halogenated alkyl group of 3-20 carbon atoms), and m and n are each independently an integer of 0-2, with the proviso that both m and n do not become simultaneously 0.

5. The liquid crystal composition as claimed in claim 4, wherein R¹ in the formula [I] representing the liquid crystal racemic mixture is a group selected from the group consisting of

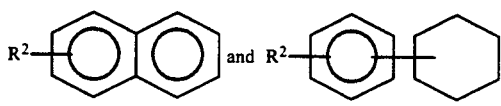

6. The liquid crystal composition as claimed in claim 4 or claim 5, wherein R² in the formula [I] representing the liquid crystal racemic mixture is an alkoxy group, X is —COO—, A is 1,4-phenylene group, m is an integer of 1 or 2, and n is 0.

7. The liquid crystal composition as claimed in claim 4, wherein said liquid crystal composition comprises a liquid crystal racemic mixture represented by the formula [I] in an amount of 1-99% by weight.

8. A liquid crystal element comprising
a cell which includes two substrates facing each other and having a gap therebetween, and
a liquid crystal material filled in the gap, wherein said substrates have an orientation control film placed on the surface, which directly faces the liquid crystal material, of at least one of the substrates, and said liquid crystal material comprises a racemic mixture represented by the following formula [I]:

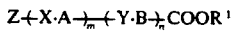 [I]

wherein R¹ is a group selected from the group consisting of a branched alkyl group of 4-20 carbon atoms, a branched alkoxy group of 4-20 carbon atoms and a halogenated alkyl group, which may be branched, of 3-20 carbon atoms, X and Y are each independently a group selected from the group consisting of —COO—, —OCO—, —CH₂CH₂—, —CH₂O—, —OCH₂—, —COCH₂—, —CH₂CO— and —S—S—, or a single bond, A and B are each independently a group selected from the group consisting of

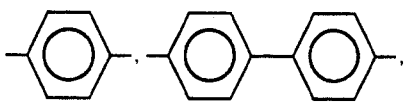

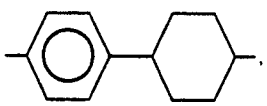

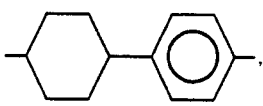

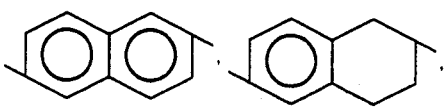

Z is a group selected from the group consisting of

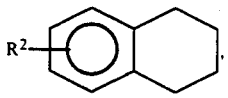

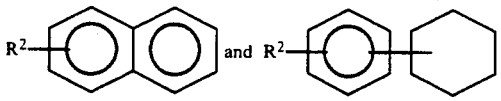

(wherein R² is each independently a group selected from the group consisting of an alkyl group of 3-20 carbon atoms, an alkoxy group of 3-20 carbon atoms and a halogenated alkyl group of 3-20 carbon atoms), and m and n are each independently an integer of 0-2, with the proviso that both m and n do not become simultaneously 0.

9. The liquid crystal element as claimed in claim 8, wherein the liquid crystal material comprises a racemic mixture represented by the formula [I] wherein R¹ is a group selected from the group consisting of

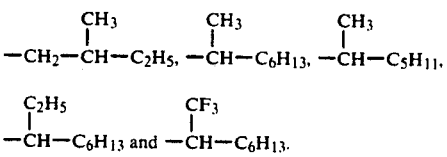

10. The liquid crystal element as claimed in claim 8, wherein the orientation control film prepared by orientation treating is placed on the surface, which faces the liquid crystal material, of at least one of the transparent substrates.

11. The liquid crystal element as claimed in claim 8 or claim 9, wherein the liquid crystal material comprises a racemic mixture represented by the formula [I] wherein $R^2$ is racemic mixture represented by the formula [I] wherein an alkoxy group, X is —COO—, A is 1,4-phenylene group, m is an integer of 1 or 2, and n is 0.

12. The liquid crystal element as claimed in claim 8, wherein the liquid crystal material comprises 1-99% by weight of a liquid crystal racemic mixture represented by the formula [I].

13. A liquid crystal display device or a liquid crystal display element having a liquid crystal element comprising
a cell which includes two substrates facing each other and having a gap therebetween, and
a liquid crystal material filled in the gap, wherein said substrates have an orientation control film placed on the surface, which directly faces the liquid crystal material, of at least one of the substrates, and said liquid crystal material contains a racemic mixture represented by the following formula [I]:

$$Z\text{-}(X\cdot A)_m\text{-}(Y\cdot B)_n\text{COOR}^1 \quad [I]$$

wherein $R^1$ is a group selected from the group consisting of a branched alkyl group of 4-20 carbon atoms, a branched alkoxy group of 4-20 carbon atoms and a halogenated alkyl group, which may be branched, of 3-20 carbon atoms, X and Y are each independently a group selected from the group consisting of —COO—, —OCO—, —CH$_2$CH$_2$—, —CH$_2$O—, —OCH$_2$—, —COCH$_2$—, —CH$_2$CO— and —S—S—, or a single bond, A and B are each independently a group selected from the group consisting of

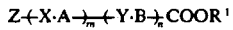

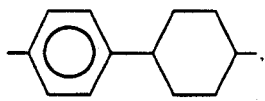

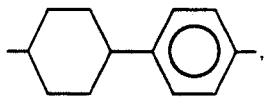

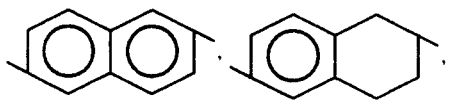

Z is a group selected from the group consisting of

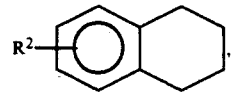

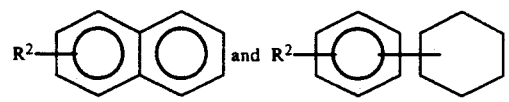

(wherein $R^2$ is each independently a group selected from the group consisting of an alkyl group of 3-20 carbon atoms, an alkoxy group of 3-20 carbon atoms and a halogenated alkyl group of 3-20 carbon atoms), and m and n are each independently an integer of 0-2, with the proviso that both m and n do not become simultaneously 0.

14. The liquid crystal display device or the liquid crystal display element as claimed in claim 13, wherein the liquid crystal material comprises a racemic mixture represented by the formula [I] wherein $R^1$ is a group selected from the group consisting of

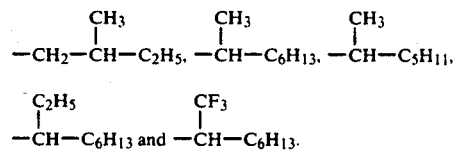

15. The liquid crystal display device or the liquid crystal display element as claimed in claim 13, wherein the orientation control film prepared by orientation treating is placed on the surface, which faces the liquid crystal material, of at least one of the transparent substrates.

16. The liquid crystal display device or crystal display element as claimed in claim 13 or claim 14, wherein the liquid crystal material comprises a racemic mixture represented by the formula [I] wherein $R^2$ is an alkoxy group, X is —COO—, A is 1,4-phenylene group, m is an integer of 1 or 2, and n is 0.

17. The liquid crystal display device or the liquid crystal display element as claimed in claim 13 wherein the liquid crystal material comprises 1-99% by weight of a liquid crystal racemic mixture represented by the formula [I].

18. The liquid crystal racemic mixture of claim 1 represented by the formula (I-A):

(I-A)

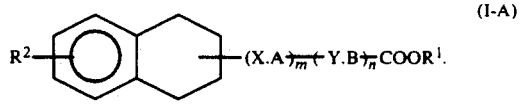

19. The liquid crystal racemic mixture of claim 18 represented by the formula:

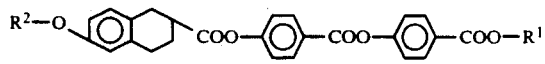

wherein $R^1$ is a member selected from the group consisting of a branched alkyl group and a branched fluorine containing alkyl group each containing 8 carbon atoms, and R² is a member selected from the group consisting of n-alkyl group containing 7-16 carbon atoms.

20. The liquid crystal racemic mixture of claim 18 represented by the formula:

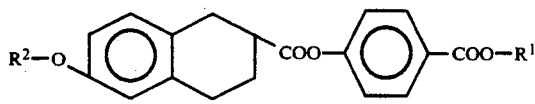

wherein R¹ is a member selected from the group consisting of a branched alkyl group and a branched fluorine containing alkyl group each containing 8 carbon atoms, and R² is a member selected from the group consisting of n-alkyl group containing 7-16 carbon atoms.

21. The liquid crystal racemic mixture of claim 1 represented by the formula (I-B):

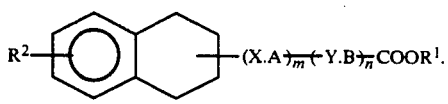

22. The liquid crystal racemic mixture of claim 21 wherein m=1 and n=1.

23. The liquid crystal racemic mixture of claim 21 represented by the formula:

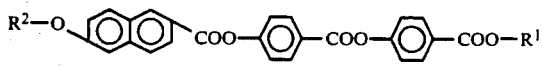

wherein R¹ is a member selected from the group consisting of a branched alkyl group and a branched flourine containing alkyl group each containing 8 carbon atoms, and R² is a member selected from the group consisting of n-alkyl group containing 7-16 carbon atoms.

24. The liquid crystal racemic mixture of claim 21 represented by the formula:

wherein R¹ is a member selected from the group consisting of a branched alkyl group and a branched fluorine containing alkyl group each containing 8 carbon atoms, and R² is a member selected from the group consisting of n-alkyl group containing 7-16 carbon atoms.

25. The liquid crystal racemic mixture of claim 1 represented by the formula (I-C):

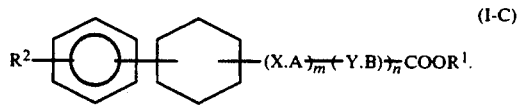

26. The liquid crystal racemic mixture of claim 25 represented by the formula:

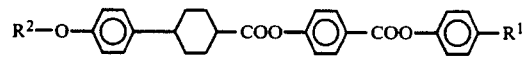

wherein R¹ is a member selected from the group consisting of a branched alkyl group and a branched fluorine containing alkyl group each containing 8 carbon atoms, and R² is a member selected from the group consisting of n-alkyl group containing 7-16 carbon atoms.

27. The liquid crystal racemic mixture of claim 25 represented by the formula:

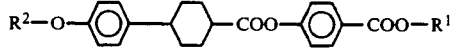

wherein R¹ is a member selected from the group consisting of a branched alkyl group and a branched fluorine containing alkyl group each containing 8 carbon atoms, and R² is a member selected from the group consisting of n-alkyl group containing 7-16 carbon atoms.

* * * * *